United States Patent [19]
Hsiung et al.

[11] Patent Number: 4,670,150
[45] Date of Patent: Jun. 2, 1987

[54] CROSS-FLOW MICROFILTRATION LIME SOFTENER

[75] Inventors: Andrew K. Hsiung; Daniel L. Comstock, both of Corvallis; Robert D. Hagen, Dallas, all of Oreg.

[73] Assignee: Neptune Microfloc, Incorporated, Corvallis, Oreg.

[21] Appl. No.: 790,651

[22] Filed: Oct. 24, 1985

Related U.S. Application Data

[63] Continuation of Ser. No. 498,803, May 27, 1983, abandoned.

[51] Int. Cl.$^4$ ............................................. C02F 1/54
[52] U.S. Cl. ......................................... 210/636; 210/637; 210/638; 210/651; 210/709; 210/713; 210/728
[58] Field of Search ................................ 210/636–639, 210/649, 650, 702, 709, 713, 714, 727, 725, 728, 106, 108, 137, 195.3, 201, 205, 206, 257.2, 321.1, 323.2, 433.2, 651

[56] References Cited

U.S. PATENT DOCUMENTS

| | | | |
|---|---|---|---|
| 2,097,876 | 11/1937 | Fuetterer | 210/289 |
| 2,354,146 | 7/1944 | Samuel | 210/220 |
| 3,043,431 | 7/1962 | Dudley et al. | 210/798 |
| 3,075,828 | 1/1963 | Kato et al. | 423/159 |
| 3,171,803 | 3/1965 | Rice et al. | 210/728 |
| 3,259,569 | 7/1966 | Priesing | 210/713 |
| 3,262,827 | 7/1966 | LeCompte | 210/712 |
| 3,654,148 | 4/1972 | Bradley | 210/636 |
| 3,738,932 | 6/1973 | Kastenbader | 210/713 |
| 3,839,199 | 10/1974 | Weiss et al. | 210/710 |
| 3,869,381 | 3/1975 | Graveland et al. | 210/715 |
| 3,976,569 | 8/1976 | Sheppard et al. | 210/724 |
| 3,996,131 | 12/1976 | Conn | 210/636 |
| 4,017,391 | 4/1977 | Black | 210/713 |
| 4,146,471 | 3/1979 | Wyness | 210/715 |
| 4,160,726 | 7/1979 | Del Pico | 210/433.2 |
| 4,243,523 | 1/1981 | Pelmulder | 210/257.2 |
| 4,276,176 | 6/1981 | Shorr | 210/433.2 |
| 4,313,830 | 2/1982 | Tulin et al. | 210/639 |
| 4,332,685 | 6/1982 | Nowlin et al. | 210/433.2 |
| 4,381,999 | 5/1983 | Boucher | 210/637 |

FOREIGN PATENT DOCUMENTS

| | | |
|---|---|---|
| 0040827 | 12/1981 | European Pat. Off. . |
| 0079040 | 4/1983 | European Pat. Off. . |

OTHER PUBLICATIONS

Porter et al., Chem. Tech., "Membrane Ultra Filtration", Jan. 1971, pp. 56–63.

Primary Examiner—Peter Hruskoci
Attorney, Agent, or Firm—Finnegan, Henderson, Farabow, Garrett and Dunner

[57] ABSTRACT

A method for softening a fluid containing hardness constituents, comprising the steps of: (a) mixing the fluid with sufficient amounts of a softening agent, and previously precipitated hardness constituents in a reactor to establish a softening reaction in the reactor for precipitating a substantial portion of the hardness constituents contained in the fluid; (b) removing a portion of the fluid and precipitated hardness constituents from the reactor as a slurry and filtering the slurry through a cross-flow microfiltration module containing at least one elongated filtration tube, whereby substantially all of the precipitated hardness constituents are removed from the portion of the fluid exiting from the module as filtrate; and (c) returning at least a portion of the filtered out precipitated hardness constiuents exiting from the module to the reactor as the previously precipitated hardness constituents.

27 Claims, 21 Drawing Figures $$\Delta P = \frac{P_1 + P_2}{2} - P_3$$

TEST APPARATUS

CROSS FLOW FILTER MODULE

TWO-PUMP CROSS-FLOW FILTER SYSTEM

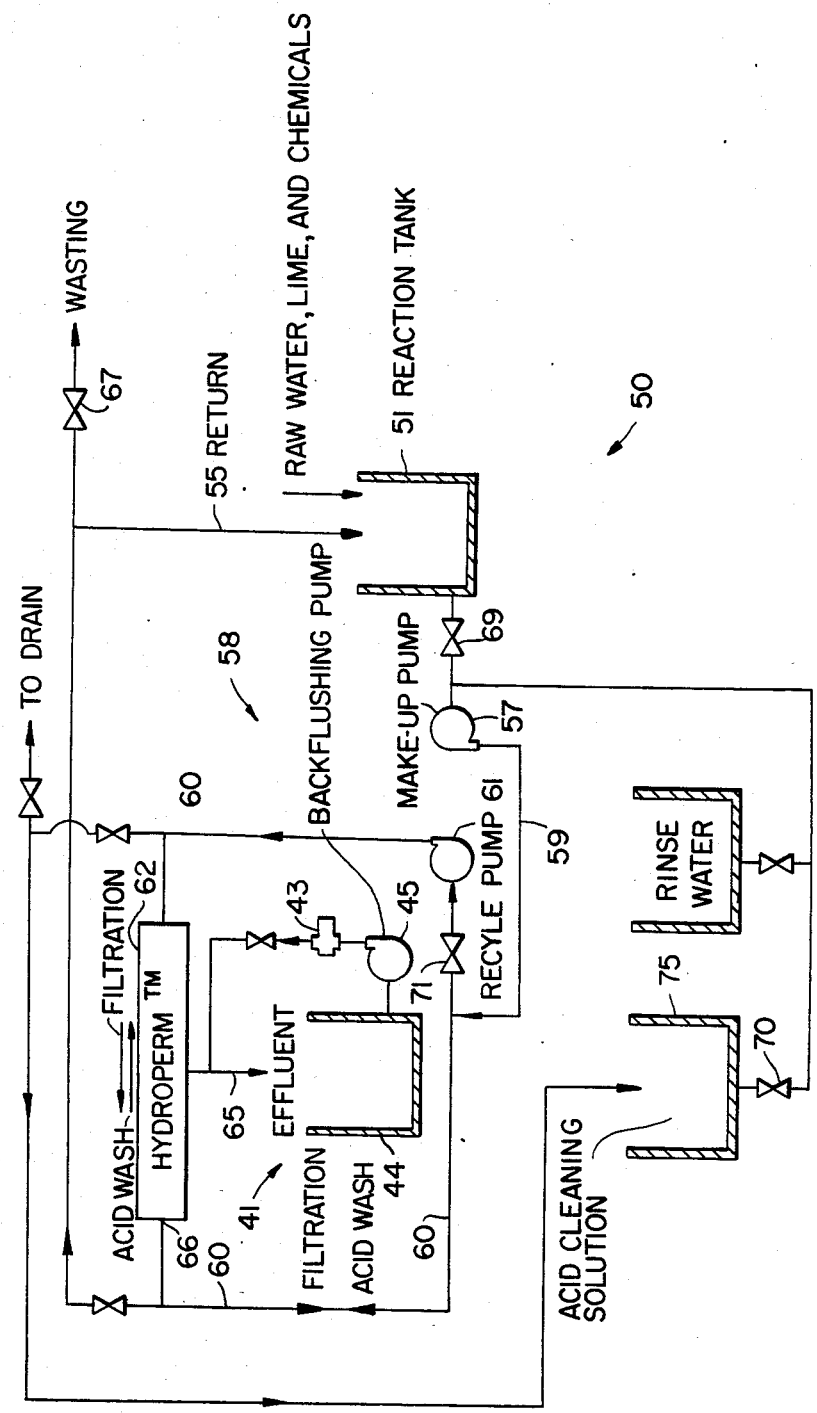
FIG. 17. SCHEMATIC DIAGRAM OF TEST UNIT

CROSS-FLOW MICROFILTRATION LIME SOFTENER

This application is a continuation, of application Ser. No. 498,803, filed May 27, 1983 now abandoned.

BACKGROUND OF THE INVENTION

The present invention relates to cross-flow microfiltration water softening for removal of dissolved, suspended and colloidal solids from water to render it suitable for household or industrial use. More specifically, the invention relates to a method and apparatus for lime softening of hard water to remove at least a portion of the hardness constituents, e.g., dissolved salts of calcium and magnesium. As used herein the term "lime softening" refers to water softening processes employing lime, hydrated lime, lime plus soda ash, excess lime, conventional coagulants, and any combination of the above.

Lime softening water treatment processes may date back to antiquity. In the modern era, prior to the 1930's, water softening was carried out as a four step process. First, the hard water was mixed with lime, or lime plus soda ash, in a mixing tank. Second, precipitation and flocculation took place in one or more flocculation chambers. Third, flocculated water then flowed into a settling chamber where precipitated slude was allowed to settle to the bottom and was drawn from the bottom of the settling chamber for disposal. A portion of the sludge so removed was recycled to the mixing tank in order to speed the softening reactions (softening kinetics depend upon seed crystal concentration as well as calcium and carbonate concentrations). Fourth, clarified water overflowed from the top of the settling chamber and was filtered.

One significant advance in lime softening water treatment processes which occurred in the 1930's was the development of what is commonly referred to as the Spaulding contact reactor. This reactor incorporated the above-noted mixing, flocculation, precipitation and settling steps in a single reactor structure. However, separate, conventional through-flow filtration equipment is still generally required in conjunction with the Spaulding reactor. Spaulding reactors are generally large, complex, cumbersome and, hence, quite costly in terms of capital investment.

The through-flow filters conventionally used in conjunction with water softening processes are generally unable to handle high solids loadings. Filtered particles continuously accumulate on and within through-flow filter media. Consequently, the filter flux rate decreases with time (or headloss increases) and frequent backwashing is required to remove the accumulated solids from the filter media. When product water is used for backwashing there is a significant net decrease in total water production. Relatively large volumes of low solids wastewater are also created which must receive some type of further handling. There is also the problem of filter breakthrough.

The present invention constitutes an entirely new and different approach to lime softening. The present invention eliminates the need for the costly Spaulding reactor (flocculator/clarifier) and substitutes, in its place, a simple mixing/recycle tank having an ordinary blowdown valve. Furthermore, in lieu of the separate through-flow filtration equipment conventionally employed in lime softening, the present invention incorporates a cross-flow microfiltration module as an integral part of the lime softening system.

Cross-flow microfiltration is substantially different from through-flow filtration, in that feed water is introduced parallel to the filter surface, and filtration occurs in a direction perpendicular to the direction of the feed flow. Cross-flow microfiltration provides economic benefits that other conventional options do not. Cross-flow microfiltration systems are capable of clarification, filtration, and thickening in one process step. Equipment and installation costs approach those of direct filtration; yet cross-flow microfiltration tion is capable of filtering streams that contain suspended solids concentrations of 10,000 mg/L or higher. Furthermore, cross-flow systems require less space than conventional throughflow systems and provide higher quality filtrate, in terms of suspended material. Other advantages include the following: (1) the ability to turn the system on and off without a lengthy stabilization period; (2) filter breakthrough cannot occur; (3) recarbonation of filtered water is not required; and (4) modular construction yields a large range of flowrate options.

Contrary to the teachings in the art, we have discovered that lime softening may be accomplished in conjunction with tubular, cross-flow microfiltration systems operating at high solids concentration, e.g., as high as 10–12%, by weight, without suffering from the conventionally expected problem of rapid, debilitating scale-up of the microfiltration tubes. The cross-flow microfiltration tubes in the lime softener of the present invention do not, as previously suggested in the art, suffer from rapidly declining flux rates due to scaling (i.e., the build up of an impermeable layer of sludge), and they are perfectly capable of being acid cleaned.

The problems of rapidly declining flux rates, susceptibility to fouling, and resistance to cleaning have been virtually eliminated in a new method of cross-flow microfiltration utilizing thick-walled porous thermoplastic tubes sold under the trademark HYDROPERM ™. The filtration characteristics of these tubes combine both the "in-depth" filtration aspects of multi-media filters and the "thin-skinned" aspects of membrane ultrafilters. The porosity of HYDROPERM ™ tubes results from the open cell reticulated structure of the tube wall. HYDROPERM ™ tubes differ from conventional membrane ultrafilters, in that they have pore sizes on the order of several microns, wherein the length of a pore is many times that of its diameter. These tubes are described in greater detail, for example, in "HYDROPERM ™ CROSS FLOW MICROFILTRATION", Daniel L. Comstock, et al., Neptune Microfloc, Inc. Report No. KT 7307, May 1982, and in Report No. 77-ENAS-51 of the American Society of Mechanical Engineers, entitled "Removal of Suspended and Colloidal Solids from Waste Streams by the Use of Cross-Flow Microfiltration", which reports are hereby incorporated herein by reference to the extent necessary for a thorough understanding of the background of the invention.

Feed flow is through the center of HYDROPERM ™ tubes at a relatively low pressure, typically less than 40 psi. The filtrate is typically collected in a jacket surrounding the exterior tube wall and withdrawn therefrom by a product line. As feed flow circulates through the tube, solid particles are slowly driven with the product flow toward the tube wall. Thus, the concentration of particles in regions close to the wall steadily increases.

In cross-flow filtration systems generally, because the direction of the feed flow is tangential to the filter surface, accumulation of the filtered solids on the filtering medium is reduced by the shearing action of the flow. Cross-flow filtration thus affords the possibility of a quasi-steady state operation with a nearly constant flux when the driving pressure differential is held constant. Unfortunately, this theoretical possibility has not been achieved in practice.

In general, any liquid from which suspended solids removal is desired will contain a wide range of particulate sizes, ranging in effective diameter from several microns down to colloidal dimensions. Because of the "in-depth" filtration characteristics of thick-walled, thermoplastic tubes, such as HYDROPERM TM tubes, particles smaller than the largest pore size of the tube may, under certain circumstances, enter the wall matrix. In any event, above a certain solids concentration in the feed, the majority of the suspended solids are retained at the inner wall of the tube and quickly form a dynamic membrane (also referred to as a "filter cake" or "sludge layer"). The dynamic membrane is thought to be largely responsible for the filtration which subsequently occurs.

Those particles initially entering into the tube wall matrix ultimately become entrapped within it, because of the irregular and tortuous nature of the pore structure. As microfiltration proceeds, penetration of additional small particles into the wall matrix is inhibited by the presence of the dynamic membrane. The formation of the dynamic membrane, together with the possible clogging of the pore structure of the tube by entrapped particles, results in a decline in the filtration flux. In conventional systems, this decline is approximately exponentially related to filtration time.

Various cleaning techniques have previously been investigated for restoring the filtration flux value. Such cleaning techniques have involved chemical and/or physical cleaning of the surface of the filter medium. For example, chemical solvents have been used to dissolve the layer-building filtered particles so as to yield a clean, layer-free filter surface. Hydrochloric acid and other acids are examples of solvents commonly being used. On the other hand, a simple physical cleaning technique commonly used is backflushing of the filter medium, i.e., temporary reversal of the filtrate flow direction. This cleaning technique is frequently used in conjunction with cross-flow filtration processes utilizing hollow tubular filters. Another physical cleaning technique employed in the art involves periodically increasing the recycle velocity longitudinally through the porous tubes. (See, e.g., U.S. patent application Ser. No. 319,066.) Higher recycle rates tend to sweep away accumulated deposits, thus minimizing the build-up of the filter cake within the tubes.

SUMMARY OF THE INVENTION

The present invention overcomes the problems and disadvantages of the prior art by providing a method and apparatus for water softening using lime softening and cross-flow microfiltration. Cross-flow microfiltration is used to separate suspended solids from the liquid. During filtration, the feedwater flows parallel to the filtering surface, and filtration occurs through the filtration tube wall at right angles to the direction of feedwater flow. Steady state operation is maintained for periods of time ranging from hours to days by balancing the hydrodynamic shear force (proportional to the recycle velocity) with the solids deposition force (proportional to the flux rate). Chemicals are added to the feedwater to increase the permeability of suspended solids and to enhance the hydrodynamic shear effects.

The cross-flow microfiltration lime softening process and apparatus of the present invention possess the below-noted distinct advantages over conventional softening systems.

(1) Higher quality filtration is obtained (with respect to particulate material) in a single process step.

(2) The size, and thus the capital costs, of the physical plant required are greatly reduced, with the softening and filtration steps being incorporated into a single structure.

(3) Complex clarifier apparatus, with its attendant upset problems, is eliminated, thus yielding significant process economic benefits, including the ability to process greater volumes of water more quickly and efficiently.

(4) The present invention permits softening of water when chelating agents are present that would otherwise prevent flocculation and sedimentation in a conventional unit.

Additional objects and advantages of the invention will be set forth in part in the description which follows, and in part will be obvious from the description, or may be learned by practice of the invention. The objects and advantages of the invention will be realized and attained by means of the instrumentalities and combinations, particularly pointed out in the appended claims.

To achieve the objects and in accordance with the purpose of the invention, as embodied and broadly described herein, the invention comprises a method for softening a fluid, typically water, containing hardness constituents, comprising the steps of: (a) mixing the fluid with sufficient amounts of a softening agent, typically including lime, and previously precipitated hardness constituents, typically including calcium carbonate, in a reactor to establish a softening reaction in the reactor for precipitating a substantial portion of the hardness constituents contained in the fluid; (b) removing a portion of the fluid and precipitated hardness constituents from the reactor as a slurry and filtering the slurry through a cross-flow microfiltration module containing at least one, and typically many, elongated filtration tube, whereby substantially all of the precipitated hardness constituents are removed from the portion of the fluid exiting from the module as filtrate; and (c) returning at least a portion of the filtered out precipitated hardness constituents exiting from the module to the reactor as the previously precipitated hardness constituents.

Broadly, the invention further comprises apparatus for softening a fluid containing hardness constituents, comprising: (a) a reactor for mixing the fluid with sufficient amounts of a softening agent and previously precipitated hardness constituents to establish a softening reaction in the reactor for precipitating a substantial portion of the hardness constituents contained in the fluid; (b) means for removing a portion of the fluid and precipitated hardness constituents from the reactor as a slurry; (c) a cross-flow microfiltration module containing at least one elongated filtration tube for filtering the slurry to remove substantially all of the precipitated hardness constituents from the portion of the fluid exiting from the module as filtrate; and (d) means for returning at least a portion of the filtered out precipitated hardness constituents exiting from the module to the reactor as the previously precipitated hardness constituents.

The accompanying drawings, which are incorporated in and constitute a part of this specification, illustrate various features of the invention and, together with the description, serve to explain the principles of the invention.

BRIEF DESCRIPTION OF THE DRAWINGS

FIG. 17 is a schematic flow diagram illustrating a further embodiment of the invention which was utilized in performing experimental testing.

DETAILED DESCRIPTION OF THE PREFERRED EMBODIMENTS

Reference will now be made in detail to the presently preferred embodiments of the invention, examples of which are illustrated in the accompanying drawings.

Figure 1:
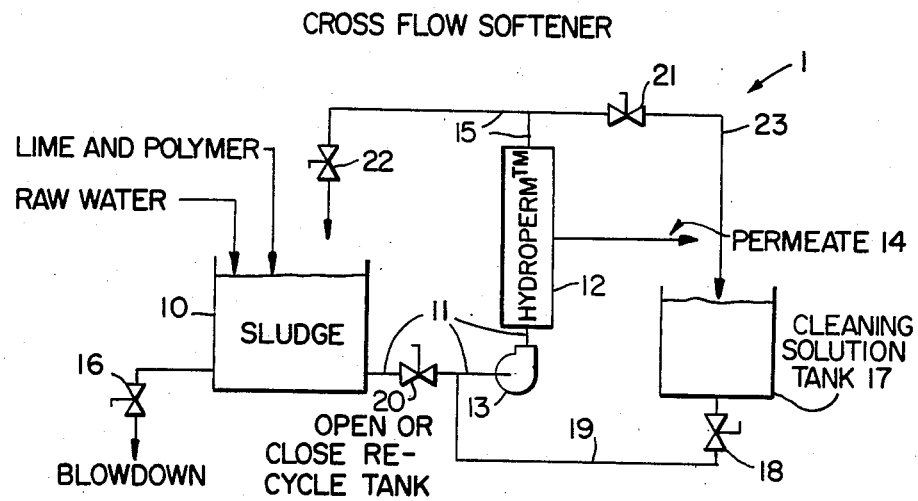
FIG. 1 is a schematic flow diagram illustrating one embodiment of a lime softening system in accordance with the present invention.

One preferred embodiment of the lime softening water treatment process of the present invention is shown in FIG. 1 and is represented generally by the numeral 1.

Raw hard water to be softened is fed into mixing/recycle tank 10, also referred to as the reactor or reaction tank, which may be open or closed. Ordinary lime (or lime plus soda ash) and preferably chemicals such as, for example, an organic polymer such as, for example, a cationic polymer, an anionic polymer, or a non-ionic polymer (all conventional), are added to mixing/recycle tank 10 (the chemicals being added to increase the filtration flux rate) and mixed with the water by stirring to precipitate out calcium carbonate and magnesium hydroxide as a sludge. The stirring should be sufficiently vigorous to prevent the precipitated particles from sinking, i.e., so that the mixture is maintained as a homogeneous slurry.

Preferably, process conditions (e.g., amounts of chemicals and recycle added) are maintained so that the calcium carbonate (and/or magnesium hydroxide) slurry concentration in tank 10 is kept within the range of from about 1 percent to about 12 percent, and more preferably within the range of from about 1 percent to about 4 percent, and most preferably about 2 percent (all percentages by weight). Such concentrations are higher than those maintained in conventional lime softening systems. At such high solids concentrations, the softening reaction will take place in mixing/recycle tank 10 in a relatively short period of time, for example, on the order of about 4 to 10 minutes (the colder the water temperature, the longer the time required). Thus, generally, the raw water and returned sludge entering tank 10 need remain in the tank for only 6 minutes or less, compared with 20–30 minutes in conventional lime softeners. Significantly, such short residence times permit the use of a considerably smaller sized mixing/recycle tank 10.

After the detention period discussed above, the slurry of water and precipitated sludge is pumped from mixing/recycle tank 10 through feed line 11 and through one or more tubular, cross-flow microfiltration modules 12 using a conventional feed pump 13. The structure and operation of microfiltration modules 12 are described in detail below. The sludge is filtered from the softened water in microfiltration modules 12, with the softened water (filtrate or permeate) exiting from the modules via product line 14 and the thickened sludge exiting from the modules via recycle line 15, at least a portion of which is normally recycled back to mixing/recycle tank 10. The filtered sludge slurry concentration will, of course, be greater than the slurry concentration in tank 10, preferably within the range of from about 5 percent to about 7 percent.

Constant or intermittent sludge blowdown is maintained from the mixing/recycle tank 10 via a conventional blowdown valve 16 or from recycle line 15 via a similar blowdown valve (not shown).

The lime softening system 1 shown in FIG. 1 preferably includes means for flushing a cleaning solution through microfiltration modules 12. As embodied in FIG. 1, such means includes a cleaning solution tank 17 containing a cleaning solution such as, for example, a 2 percent, by weight, hydrochloric acid solution. Microfiltration modules 12 are preferably cleaned intermittently with the cleaning solution by opening the cleaning solution tank 17 exit valve 18 and pumping the solution through line 19 and modules 12 using feed pump 12. Valve 20 in feed line 11 must, of course, be closed during the cleaning operation. The portion of the cleaning solution exiting from modules 12 via recycle line 15 (ie., the portion of the solution which is not permeated through the filtration tubes) is returned to cleaning solution tank 17 by opening valve 21 and closing valve 22 during cleaning, so as to direct the solution through return line 23, as shown.

Table A tabulates the raw and softened water quality parameters, as well as the standard marble test results, observed experimentally using a lime softening system 1 similar to that shown in FIG. 1. As can be readily seen, excellent water softening efficiency was achieved. The concentrations in Table A are expressed in parts per million (ppm) and, unless otherwise noted, refer to calcium carbonate. The hypothetically calculated quality was determined from standard tables based on the amount of lime added and the composition of the raw water.

The experimental data reported in Table A were generated using a 200 ppm addition of lime and a 1 ppm addition of a cationic organic polymer to raw water having the characteristics noted in Table A. The weight percent of calcium carbonate in the mixing/recycle tank 10 was maintained at about two percent (2%).

The experiments reported in Table A were conducted using three 4 ft. long tubular filtration modules piped in series, each module comprising a 1½ in. outer diameter filtrate collection jacket having twelve approximately 4 ft. long HYDROPERM TM tubes (described below) encased therein, with each tube having an inner diameter of 6 mm.

The tubular filtration modules 12 were cleaned by recycling a 2% or higher, by weight, cleaning solution of hydrochloric acid through the modules for 5 minute intervals every twelve to twenty-four hours.

The structural and functional characteristics of the crossflow microfiltration modules 12 utilized are described in detail below.

Preferably, the filtration flux rate of the modules is maintained within the range of from about 1050 gallons per day per total square feet of active filter tube surface area (gpd/sq. ft.) to about 1500 gpd/sq. ft., and the recycle velocity of the water - sludge slurry longitudinally through the tubular filtration modules 12 is maintained within the range of from about 4 feet per second (fps) to about 7 fps, measured at each module exit (where the slurry enters recycle line 15), irrespective of the filtration flux rate.

Cross-flow microfiltration in accordance with the invention may be accomplished, for example, using thick-walled, microporous thermoplastic tubes. These tubes can be made from a wide variety of extrudable thermoplastics, such as, for example, nylon, polypropylene or polyethylene, and typically have walls of about one millimeter in thickness. Although subject to variation, such tubes may, for example, possess a dominant pore size on the order of about one to ten microns and, preferably, an average pore diameter of about 2 microns, and a porosity on the order of about 65% i.e., the pores cover 65% of the surface area of the tubes. The preferred, although certainly not the only, porous thermoplastic tubes useful in practicing the present invention are the previously mentioned HYDROPERM TM tubes having the characteristics referred to above, which tubes are presently commercially available from Neptune Microfloc, Inc., of Corvallis, Oreg.

Figure 2:
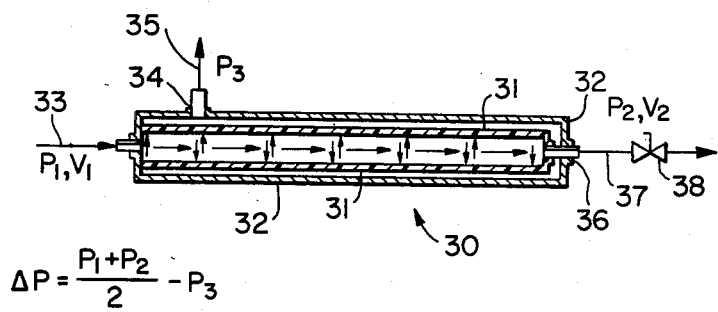
FIG. 2 is a schematic, sectional view of a cross-flow microfiltration tube, showing the direction of feed flow (circulation) and the direction of filtrate flow (permeation)

A schematic view of cross-flow filtration through a filtration module containing such a thick-walled, microporous thermoplastic tube is shown in FIG. 2. FIG. 2 is a schematic flow diagram, in partial cross section, of filtration module 30. Softened water containing suspended solids to be filtered (precipitated sludge) flows through the inside of filter tube 31 in the direction shown by the arrows at relatively low pressures, e.g., 2 to 50 psi, preferably about 35 psi, and permeation of the softened water occurs transversely through the tube wall, which is relatively thick, e.g. on the order of about one millimeter. As shown, module 30 includes a single microporous filter tube 31 (e.g., a HYDROPERM TM tube) encased within a closed filtrate collection jacket 32. Typically, jacket 32 may be constructed of polyvinyl chloride (PVC). Preferably, commercial scale filtration modules 30 will include a plurality (as many as hundreds) of filter tubes 31 arranged in a parallel tube bundle (not shown) within a single jacket 32. In accordance with the present invention, lime softening modules are typically constructed in lengths of about 6.7 ft., or longer, with outer diameters of 8 to 12 inches and filter tube active surface areas typically on the order of 150 sq. ft. and 300 sq. ft., respectively. A conventional inlet (circulation) pump (not shown) provides the requisite inlet pressure ($P_1$) and liquid flow velocity ($V_1$) in feed line 33.

A portion of the water is permeated transversely through the wall of filter tube 31 in the direction shown by the arrows, thereby depositing at least a portion of the solids on the inner surface of tube 31 as a dynamic membrane (not shown), as discussed previously. The liquid permeated through filter tube 31 (i.e. the softened filtrate) is collected in closed jacket 32 surrounding filter tube 31, and the collected liquid is removed from jacket 32 via a port 34 extending through the jacket and connected to product (filtrate) line 35. The filtrate exit pressure in product line 35, designated ($P_3$), is essentially zero in conventional cross-flow filtration systems.

The sludge which is not permeated through the wall of filter tube 31 exits from module 30 via port 36 in jacket 32 and via exit line 37 connected thereto at a velocity designated $V_2$ and at an exit pressure designated $P_2$, as shown. A conventional back pressure valve 38 situated in exit line 37 establishes a net positive pressure in filter tube 31, as known in the art.

During the initial stages of microfiltration, a majority of the suspended solids in the sludge is deposited onto the tube wall as a dynamic membrane. The equivalent pore diameters in the dynamic membrane are several orders of magnitude smaller. Consequently, particles much smaller than 2 microns are filtered out by the tube wall. The growth of the dynamic membrane is limited by the shear forces acting on it due to the circulation velocity of the liquid flowing lengthwise along the tube. This shearing action takes the form of erosion. The balance of the deposition rate and the erosion rate of the dynamic membrane establishes an equilibrium membrane thickness, and therefore the equilibrium (plateau) fluxes, for the feed being filtered. This balancing condition is critically dependent on the characteristics of the suspended solids in the water-sludge mixture. Two types of suspended solids can be categorized as limiting cases, namely, those which are cohesionless and those which are cohesive. For cohesive solids, the bonding stress between particles is relatively large, so that once they are brought into contact, higher shearing force is required to break their bond. In other words, this type of solid requires a relatively strong erosion effect. On the other hand, cohesionless solids have weak bonds with respect to each other and are therefore much more easily eroded. Even in the case of a cohesionless solid, however, binding to the interior wall of the filter tube may occur, thus producing a thin, adhering layer immediately adjacent to the wall, which will require a strong erosion effect in order to remove it.

Other parameters that govern solids behavior are the effective solid particle diameter and the particle size distribution in the feed. The characteristics of the water-sludge mixture, such as pH, viscosity, etc., may also show some influence on the behavior of the suspended solids. Chemical additives are commonly used in wastewater treatment, and their addition to the wastewater will also change the characteristics of the suspended solids, and thus will vary the flux rate.

Since it is desirable to render the dynamic membrane on the filter tube wall cohesionless, chemical pretreatment of the water-sludge mixture prior to cross-flow filtration may prove advantageous in practicing the invention. In general, the objective of such pretreatment should be to obtain a mixture comprising a fluffy or loose type, cohesionless floc. Examples of typical conventional pretreatment additives suitable for use in the present invention include, without limitation, conventional flocculants (e.g., calcium hydroxide, alum, calcium sulfate, ferric hydroxide, etc.), polyelectrolyte flocculants, and additives such as those disclosed in U.S. Pat. No. 4,313,830.

FIGS. 3A–3D illustrate the operation of another embodiment of the lime softening system 50 of the present invention; specifically, the softening, first flushing, cleaning and second flushing cycles of operation, respectively. In these Figures, the direction of fluid flow is indicated by small arrows inside the flow lines.

During the softening cycle (FIG. 3A), raw (untreated) water enters the system 50 at reaction tank 51 via feed line 52 and water feed valve 53. Reaction tank 51 preferably contains a reactive slurry of calcium carbonate to enhance the softening reactions (i.e., seeding). Lime slurry and chemical additives (e.g., an organic polymer) are added to reaction tank 51 via line 54 according to raw water requirements and softening process needs. For example, an automatic pH controller (not shown) is preferably installed on product line 65 for the purpose of modulating a lime slurry pump (not shown) feeding to line 54 to maintain the desired system pH. Preferably, the pH measured at the product line is maintained within the range of from about 9.5 to about 11.5, depending on the raw water composition, in order to establish satisfactory precipitation of the calcium and magnesium hardness constituents, while avoiding deleterious filtration tube fouling.

The contents of reaction tank 51 are completely mixed on a continuous basis by conventional mixing means (not shown) to prevent settling of precipitated solids, and the tank is sized to ensure sufficient reaction time, preferably on the order of about 4 minutes.

In addition to the raw water feed, a slurry containing calcium carbonate and other solids returned from the filtration process loop enters reaction tank 51 via solids return line 55 and solids feed valve 56. The returned solids aid in maintaining the desired reaction tank slurry concentration.

A conventional make-up (feed) pump 57 transports the mixed and reacted contents of reaction tank 51 into the cross-flow microfiltration system 58 via line 59. The inlet pressure of system 58 is preferably about 35 psi. The slurry from reaction tank 51 mixes with the flow in the microfiltration system recycle loop 60, which is maintained by conventional recycle pump 61, and passes through the tubular (preferably HYDROPERM TM) cross-flow microfiltration module 62. Filtration occurs at right angles to the feed flow and clean product water collects in the shell side (not shown) of module 62 and is removed through two ports 63, 64 located on the side of the module.

The product water flux rate transversely through the filtration tube walls (not shown) of module 62 and out of ports 63, 64 is preferably held constant during the softening cycle by a fixed rate flow controller (not shown) situated in product (i.e., softened water) line 65, which is connected to ports 63, 64 as shown. Apparatus and procedures for maintaining the flux rate constant are described in detail below (see, e.g., FIGS. 5A, 5B and 6).

A portion of the filtered waste sludge exiting as a slurry from the discharge end 66 of microfiltration module 62 is removed from lime softening system 50 by intermittent blow-down through conventional blow-down valve 67. In addition, a portion of the slurry remaining in recycle loop 60 is constantly returned to reaction tank 51 via solids feed valve 56 and return line 55 to maintain the reactive slurry (seeding) therein, as discussed previously.

Figure 3A:
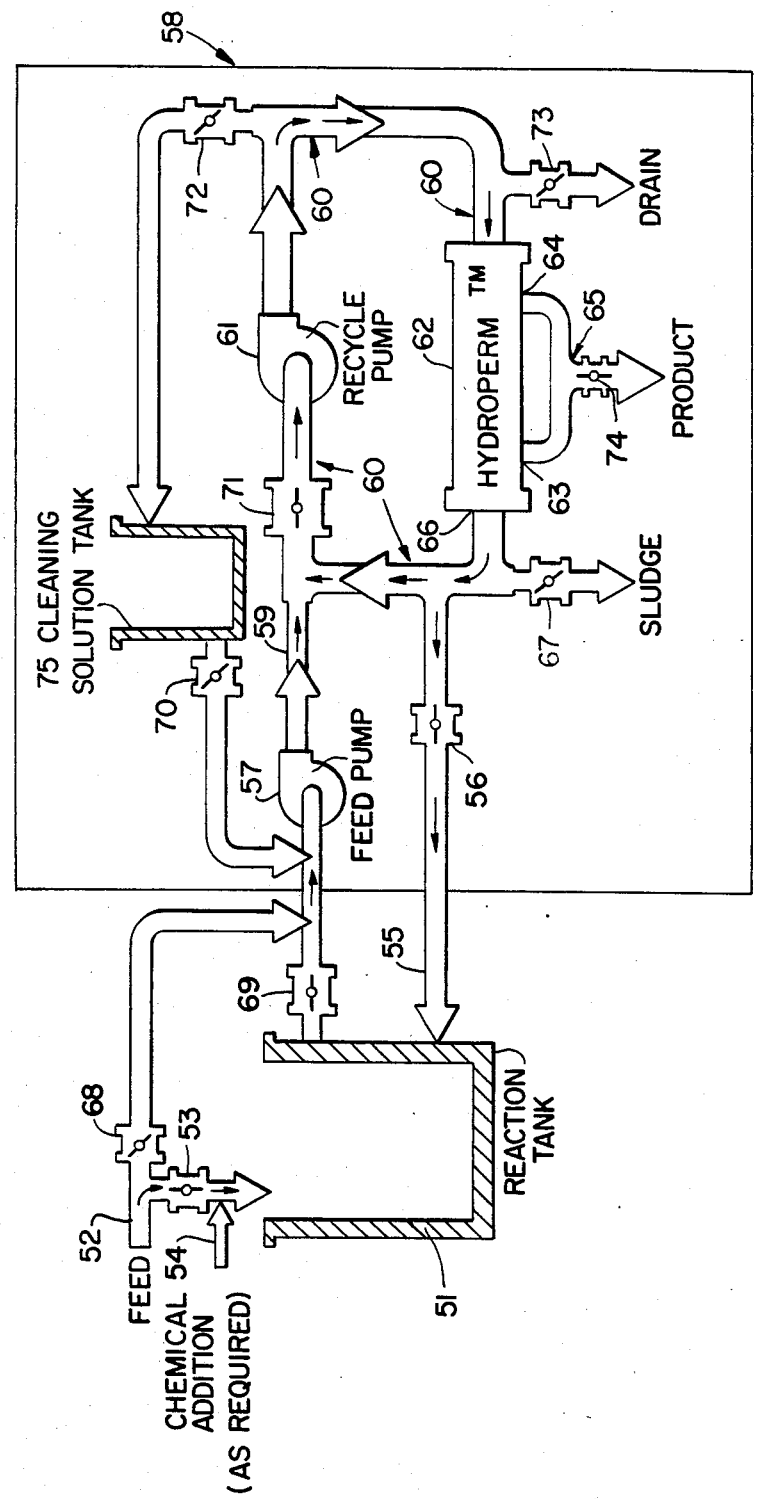
FIGS. 3A-3D are schematic flow diagrams illustrating the various cycles of operation of a further embodiment of a lime softening system in accordance with the present invention.

During the softening cycle, valves 53, 56 and 67–74 are positioned as shown in FIG. 3A in order to maintain fluid flow in the direction indicated by the small arrows.

Figure 3B:
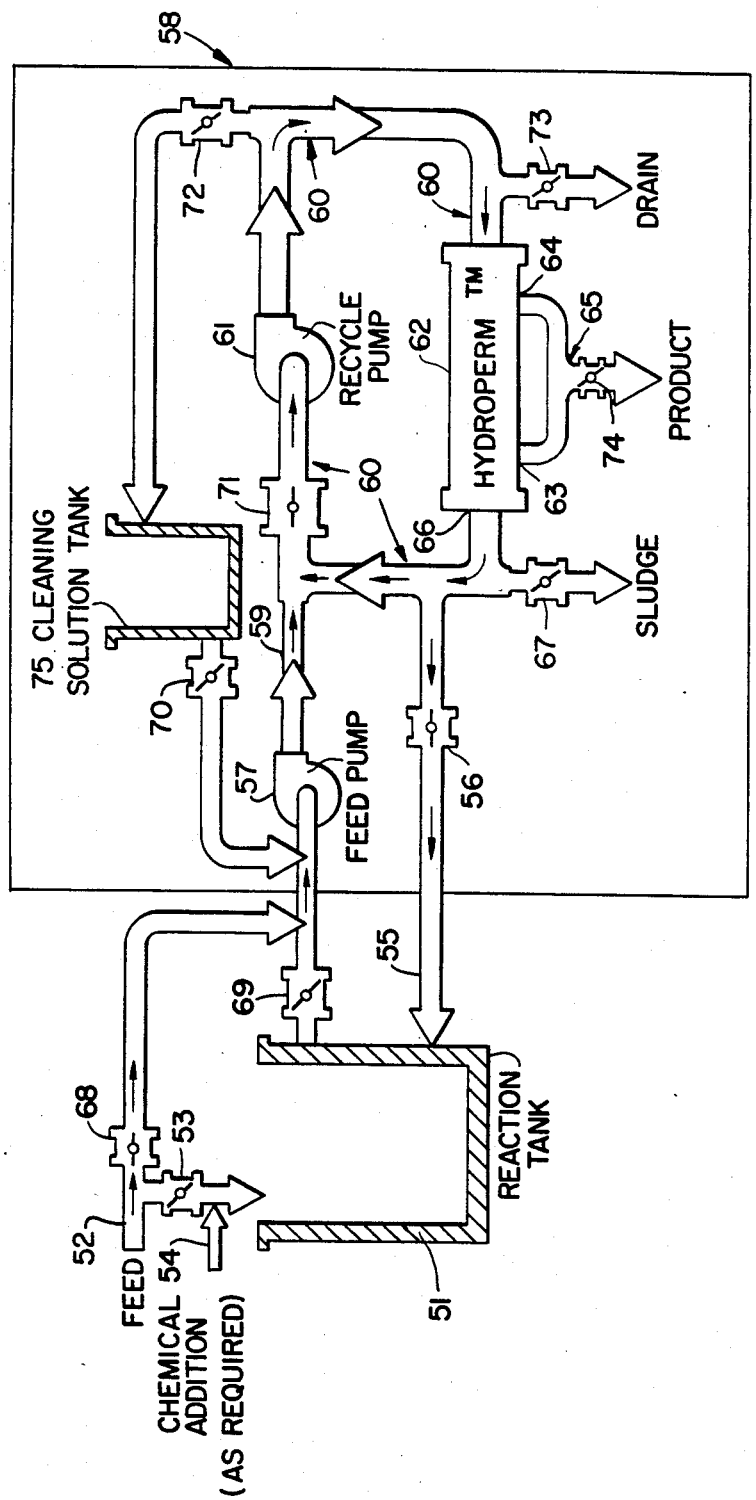

The first flushing cycle, depicted in FIG. 3B, is interposed between the softening cycle (FIG. 3A) and the cleaning cycle (FIG. 3C) and serves to minimize the amount of cleaning solution required during the cleaning cycle.

During the first flushing cycle, valves 53, 56 and 67–74 are re-positioned as shown in FIG. 3B in order to establish the flow of untreated raw feed water directly to and through microfiltration system 58 and into reaction tank 51 as shown by the arrows. In the first flushing cycle, recycle pump 61 operates while the make-up pump 57 flushes the untreated raw water into the system 58. Initially, the slurry within recycle loop 60 is directed via return line 55 back to reaction tank 51, as shown. However, after the bulk of the solids contained in recycle loop 60 have been returned to reaction tank 51, solids feed valve 56 is closed and valve 67 is opened so as to drain the balance of the flush water before commencing the cleaning cycle.

Figure 3C:
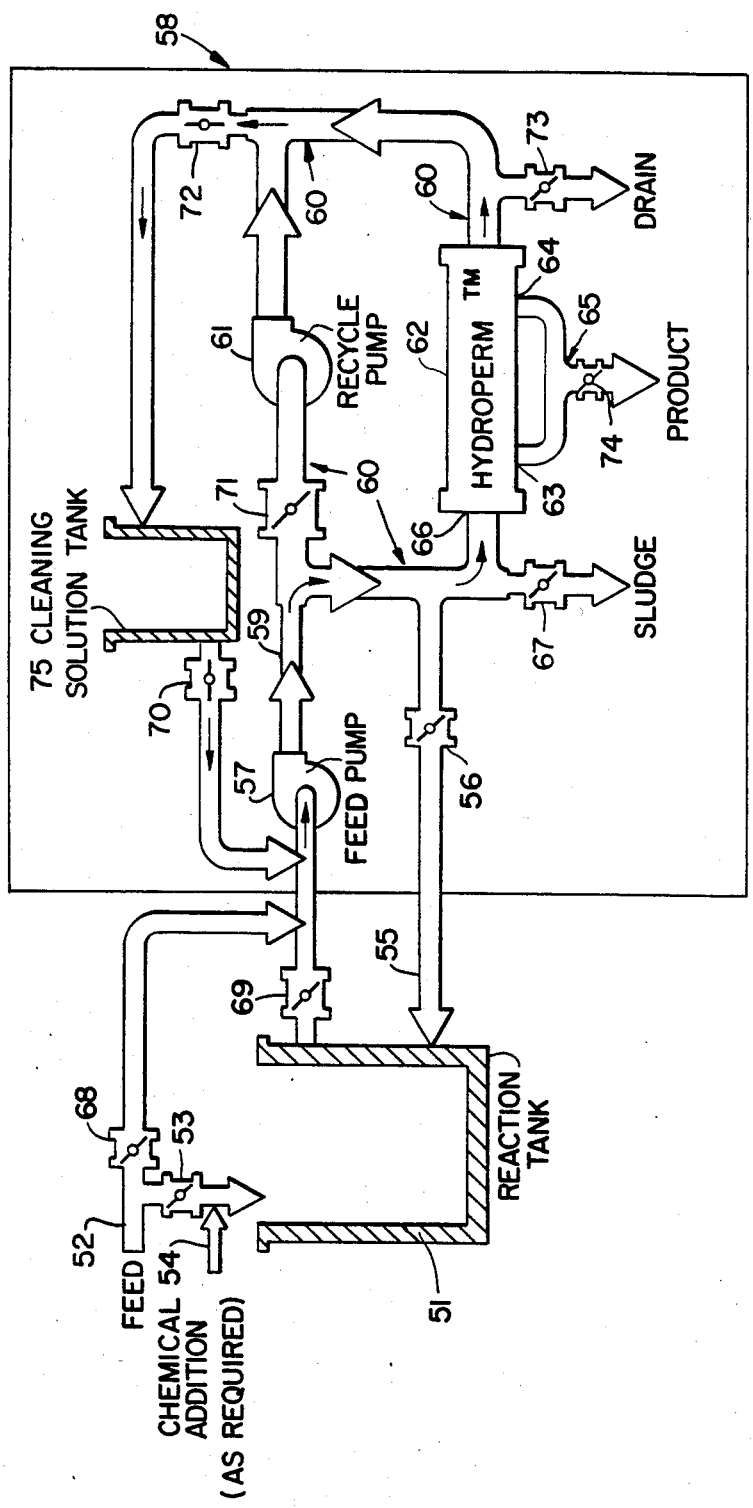
Figure 3D:
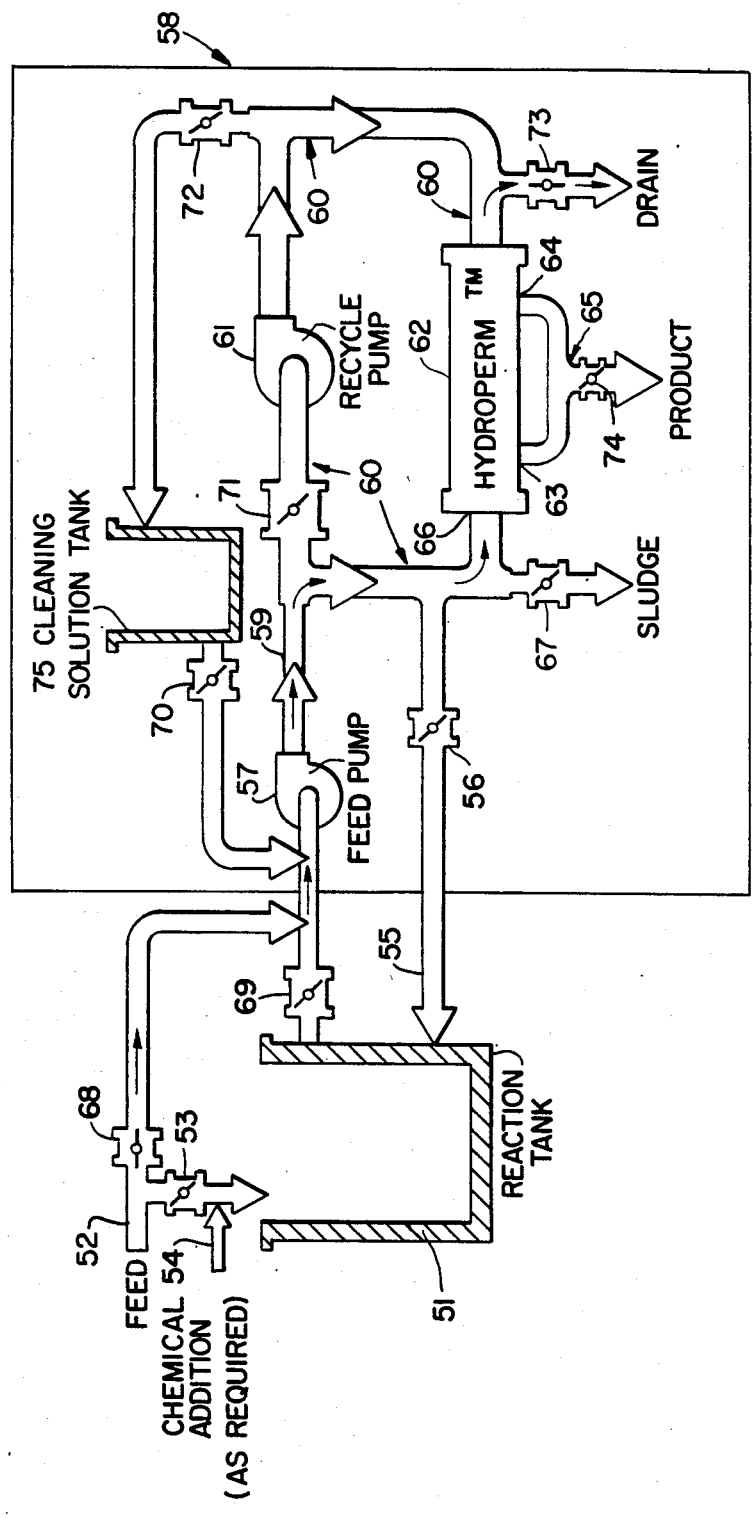

During the cleaning cycle, depicted in FIG. 3C, valves 53, 56 and 67–74 are re-positioned as shown in order to establish the flow of cleaning solution from the solution tank 75 through microfiltration module 62 and back to tank 75 in the direction indicated by the small arrows. In the cleaning cycle, make-up pump 57 takes suction from solution tank 75, as shown. The cleaning cycle is continued for a period typically ranging from about 5 to 10 minutes, and the interval between successive cleaning cycles is preferably about 12 hours, or longer.

The cleaning cycle is followed by a second raw water flushing cycle designed to remove cleaning solution from the module 62 and recycle loop 60. The second flushing cycle, depicted in FIG. 3D, requires the repositioning of valves 53, 56 and 67–74 as shown in order to establish raw water flow through module 62 and out drain valve 73 in the direction indicated by the small arrows. Upon completion of the second flushing cycle, the required valving changes are automatically effected so that the lime softening cycle, as depicted in FIG. 3A and described above, is immediately restarted.

Flushing, cleaning and softening (filtration) cycles, as described above, are preferably automatically controlled, and may be triggered by a pressure switch located in the product water line 65 or by a preprogrammed timer (not shown).

The lime softening system of the present invention is preferably provided with a remote-mounted influent control valve (not shown) equipped with a proportioning pilot control (not shown) and a float control (not shown) mounted in the reaction tank. These devices, which are all conventional, maintain a constant level in reaction tank 51 and respond to demand as a result of system operation.

Figure 4:
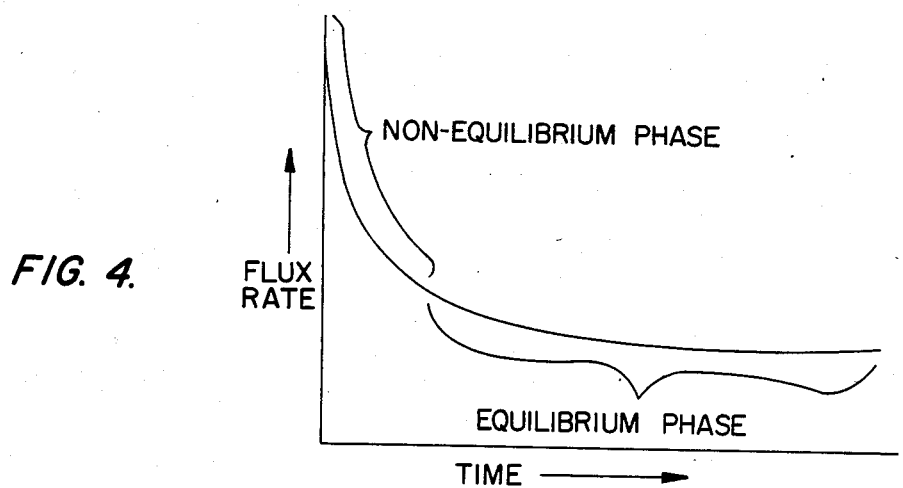
FIG. 4 is a graph showing a typical flux rate vs. time curve for conventional cross-flow filtration devices.

As previously noted, conventional cross-flow filtration devices experience a decline in flux rate during filtration runs until an equilibrium (plateau) flux rate is attained. Typically, such conventional devices exhibit a flux rate vs. time curve similar to that shown in FIG. 4. As shown in FIG. 4, such a curve comprises two distinct phases, namely (1) a non-equilibrium phase immediately following start-up (time zero) and characterized by high, but rapidly declining, flux rates, and (2) an equilibrium phase following the non-equilibrium phase and characterized by lower flux rates which decline much more slowly with time. The non-equilibrium phase usually extends over the first several hours of a filtration.

Flux rates (F) observed during the non-equilibrium phase of such flux/time curves are proportional to the feed velocity (V), the pressure differential ($\Delta P$) and time (t) according to the following general relationship:

$$F \alpha V^a \cdot \Delta P^b \cdot t^{-c}$$

The aforementioned parameters are defined in FIG. 1.

In contrast, the flux rates observed during the equilibrium phase (i.e., plateau fluxes) of such flux/time curves are proportional essentially only to feed velocity.

Although there are many ramifications associated with operation of cross-flow filtration systems in the non-equilibrium phase, one distinctive characteristic is that non-equilibrium flux rates (i.e., fluxes in the non-equilibrium phase) are higher than equilibrium flux rates (i.e., fluxes in the equilibrium phase). While it would thus be highly desirable to operate cross-flow filtration systems in a non-equilibrium mode, the extremely rapid (approximately exponential) flux decline associated with the non-equilibrium phase has, to date, made this totally impractical. That is, the high flux rates associated with the non-equilibrium phase exist for too short a period of time to be of practical value.

However, operation of cross-flow filtration systems in a non-equilibrium mode for extended periods of time is possible, while maintaining flux rates in excess of conventional equilibrium (plateau) flux rates. This is made possible by the relatively simple expedient of product (i.e., filtrate) line throttling. Specifically, when the flow rate of the filtered product is throttled so as to maintain a constant flux rate below the ordinary initial flux rate (i.e., the flux rate at the beginning of a new filtration run, immediately after tube cleaning and in the absence of any throttling; also referred to herein as the "zero time" or "clean" flux rate), it is possible to maintain a steady flux rate higher than the equilibrium (plateau) flux rate for relatively long periods of time, e.g. runs lasting hours to days. In this mode of operation, the pressure differential ($\Delta P$) increases with time throughout the run as required to maintain the selected constant flux rate.

The advantages of product throttling in cross-flow filtration systems include: (1) the ability to maintain flux rates at higher than equilibrium (plateau) values; (2) reduction of the compressive forces acting on the dynamic membrane formed on the interior tube surface (such forces lead to reduced flux rates and possible tube matrix plugging); (3) reduction of the rate of deposition (i.e., growth) of the dynamic membrane; and (4) the ability to maintain a constant flow rate to downstream equipment requiring same, e.g., reverse osmosis units.

Figure 5A:
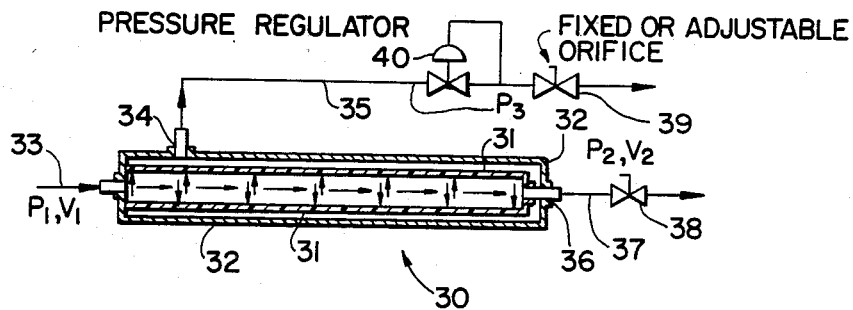
FIG. 5A is a schematic flow diagram illustrating one embodiment of a filtration tube module utilizing product line throttling which is suitable for use in the lime softening system of the present invention.

FIG. 5A is a schematic flow diagram, in partial cross section, showing a simplified embodiment of a filtration tube module 30 similar to that depicted in FIG. 2, but also incorporating product line throttling. Such a module is particularly suited for use in the lime softening system of the present invention. For ease of understanding, equipment which is common to that shown in FIG. 2 bears the same reference numeral. In accordance with this embodiment of the present invention, product line throttling is achieved by placing a flow controller (e.g. a Griswald flow controller—not shown) or a pressure regulator 40 and valve 39 in tandem in product line 35, as shown, and by partially closing valve 39. Product line throttling is used to maintain a constant flux rate over the entire length of a filtration run by continually increasing the pressure differential $$\left( \text{i.e., } \Delta P = \left( \frac{P_1 + P_2}{2} \right) - P_3 = \text{the driving pressure} \right)$$

throughout the run. The pressure differential is increased by reducing the value of $P_3$ by reducing the throttling pressure applied to product line 35 (using valve 39 and pressure regulator 40).

By way of hypothetical example, if the filter tube inlet pressure $P_1$ is initially 30 psi, the initial product line pressure $P_3$ in conventional cross-flow filtration devices is 0 psi, so that the initial pressure differential $\Delta P$ (driving pressure) is approximately 30 psi. In such conventional devices, the pressure differential remains substantially constant over time, so that the pressure differential at the end of the filtration run will continue to be on the order of 30 psi. As noted previously, during the course of conventional filtration runs, the flux rate will decline rapidly until the plateau flux is reached.

In contrast to such conventional devices, the present invention provides flux enhancement by throttling the product line pressure $P_3$, using pressure regulator 40 and valve 39. Referring to the above-mentioned hypothetical example, if the filter tube inlet pressure $P_1$ is 30 psi at the start up of the filtration run, the initial product line pressure $P_3$ in the present invention will be throttled so as to provide the initial pressure differential required to provide the desired constant flux rate at start up. For example, $P_3$ might be throttled to 20 psi initially, thus producing an initial pressure differential of 5 psi. The flux rate is selected based on practical economic factors presented by the particular filtration application of concern; but in every case it will be higher than the plateau flux reached if product throttling were not employed. Thus, despite the fact that the initial flux rate is lower in the present invention, because of product line throttling, the time-averaged flux rate over the entire run will be higher than that of conventional systems.

As the filtration run progresses, the product line (throttling) pressure $P_3$ is continually reduced, thus increasing the pressure differential ($\Delta P$) in order to maintain the flux rate at the desired constant value. Eventually, as the run continues, the driving pressure $\Delta P$ will increase to the value of the average of the inlet pressure $P_1$ and the outlet pressure $P_2$, with $P_3$ being reduced to zero at the end of the filtration run. At this point, the system will resemble a conventional system, and flux decline to the equilibrium (plateau) flux rate will occur. Thus, the selection of the values for the initial inlet pressure $P_1$, the initial product line pressure $P_3$ (i.e., the throttling pressure initially applied), and the constant flux rate will depend on such practical factors as the desired length of the filtration run (i.e., the number of hours the filtration device must routinely operate before it can be shut down for cleaning), the volume of liquid to be filtered during such runs, and the cost of the equipment required to generate the inlet and throttling pressures.

Preferably, for tubular microfiltration systems constructed in accordance with the present invention, the value of the initial inlet pressure $P_1$ will be within the range of from about 25 to about 40 psi, the value of the initial product line (throttling) pressure $P_3$ will be within the range of from about 20 to about 35 psi, the lower limit of $\Delta P$ (pressure differential) will be within the range of from about 2 to about 6 psi, still more preferably on the order of about 5 psi, and the upper limit of $\Delta P$ will be about 40 psi.

Figure 5B:
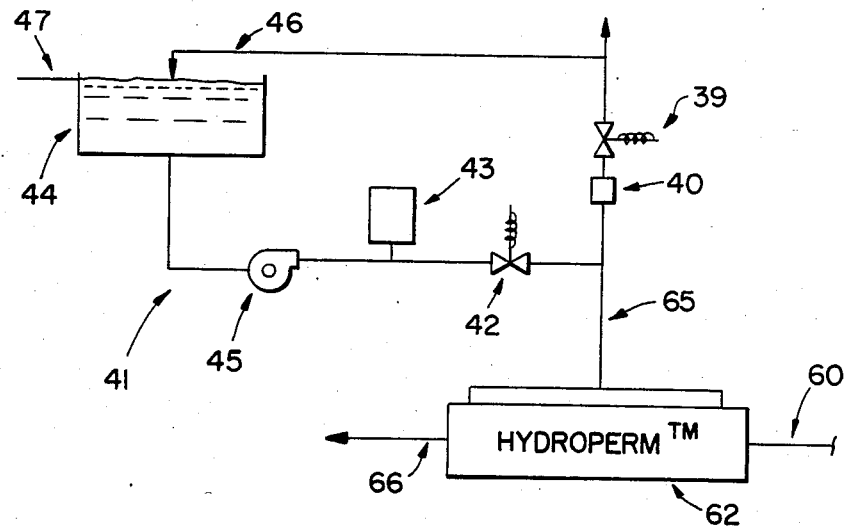
FIG. 5B is a schematic partial flow diagram illustrating a preferred embodiment of a filtration tube module for use in the lime softening system of the present invention which incorporates means for product line throttling and means for cleaning the module by backflushing.

FIG. 5B is a schematic partial flow diagram showing another embodiment of a cross-flow microfiltration module incorporating product line throttling which is suitable for use in the microfiltration system 58 disclosed in FIGS. 3A–3D. For ease of understanding, the features shown in FIG. 5B that correspond to features shown in FIGS. 3A–3D or FIG. 5A bear the same reference numerals. Product line throttling is achieved by placing flow controller 40 and valve 39 in tandem in product line 65 and by partially closing valve 39 in order to maintain a constant flux rate during the filtration run, as fully described above in connection with FIG. 5A and the hypothetical example relating thereto.

In accordance with the invention, product line throttling, as described above, is preferably practiced in combination with another flux enhancement technique, namely, slow start up of the liquid flow transversely through the filter medium at the beginning of the filtration run.

Specifically, the method of the present invention preferably further includes the step of commencing the filtration run by gradually increasing the flow rate of the softened filtrate from essentially zero (at start up) to the desired operational flow rate over a sufficiently extended period of time to substantially prevent deleterious intrusion of the particles of material being filtered out of the liquid into the filter tube matrix. As will be discussed in greater detail below, such extended period of time is preferably within the range of from about 15 seconds to about 60 seconds, and still more preferably, from about 30 seconds to about 45 seconds. Such slow start up of the liquid flow through the filter medium yields longer filtration runs (lower pressure differentials $\Delta P$) both when accompanying product line throttling and when practiced alone.

Preferably, such slow start up is accomplished by beginning the filtration run with product line throttling valve 39 (FIGS. 5A and 5B) fully closed, and then gradually (and preferably steadily) opening valve 39 slowly over the time periods noted above.

In accordance with the invention, product line throttling and/or slow start up, as described above, are preferably practiced in combination with yet another flux enhancement technique, namely, product port closure during cleaning.

Specifically, the method of the present invention preferably further includes the step of cleaning the surface of the filter medium prior to commencement of the filtration run by flowing a cleaning solution laterally over the surface of the filter medium while simultaneously temporarily eliminating the pressure differential $\Delta P$ across the filter medium, preferably by blocking all flow from jacket 32 (FIG. 5A), e.g., by closing product port 34 (using, for example, a conventional valve, not shown) or by fully closing valve 39 in product line 35. For example, the cleaning solution may contain hydrochloric acid. Cleaning HYDROPERM ™ microporous filter tubes with an acid-containing cleaning solution while keeping product port 34 (FIG. 5A) of collection jacket 32 open produces flux rates which, although initially quite high, decline rapidly (approximately exponentially) with time to unacceptably low levels. By closing product port 34 during acid cleaning, considerably lower pressure differentials can be achieved, thus leading to enhanced flux rates. This technique may be practiced alone or in combination with product line throttling and/or slow start up, as described previously.

All of the above-described flux enhancement techniques, either individually or in combination, are preferably practiced together with some conventional form of physical cleaning of the filter medium. For example, it is preferable to practice product line throttling, slow start up, and/or product port closure in combination with such known physical cleaning techniques as periodic backflushing or periodically increasing recycle (circulation) velocity.

Specifically, the method of the present invention preferably further includes periodically backflushing a liquid (preferably including the filtrate from filtration) transversely through filtration module 62 (FIG. 5B) by reversing the direction of the pressure differential.

FIG. 5B illustrates an embodiment of the filtration tube module of the invention which includes means 41 for periodically backflushing product water through the module 62. As shown in FIG. 5B, backflushing means 41 is connected to product line 65 of the module. Filtration module 62 in FIG. 5B corresponds generally to module 62 in FIGS. 3A–3D in both structure and operation.

Backflushing is accomplished, for example, by closing solenoid valve 39 and opening solenoid valve 42, which allows accumulator 43 to feed product water (previously collected therein) through product line 65 in a direction opposite to the direction of normal product flow. Product water thus flows back into filtration module 62 and backflushes transversely through the filtration tube walls and into the tubes. No other valves in the system are actuated, except for raw water feed valve 53 (FIG. 3A), which is closed. Recycle flow continues through filtration module 62 and recycle loop 60, but at a slightly higher pressure, during the backflushing cycle. During backflushing, product water is not produced, and raw water does not enter reaction tank 51 (FIG. 3A), the level of which is controlled by a float or other conventional level control type valve 53.

Accumulator 43 is fed from holding tank 44 via hydraulic pressure pump 45. Holding tank 44 is fed from product line 65 by drawing off a portion of the product water via line 46 during the softening cycle. Overflow line 47 is preferably provided off holding tank 44 as shown.

The duration of each backflushing pulse is preferably about 2 seconds, and the interval between backflushings is preferably within the range of from about 1 minute to about 2 minutes, or possibly longer. The backflushing pressure (at the air chamber of the accumulator 43) is preferably on the order of about 50-70 psi, and the backflush flow is on the order of about 0.5 gallons per minute per square feet of active filter tube surface area, or less.

As an alternative to backflushing, particularly in conjunction with microfiltration, the method of the present invention also preferably further includes periodically increasing the recycle velocity of the liquid flowing laterally along the surface of the filter medium, with the duration of each such periodic increase being within the range of from about 5 to about 60 seconds, and the interval between such periodic velocity increases not exceeding about 20 minutes. The recycle velocity is preferably increased to a value within the range of from about 10 to about 20 ft. per sec., using techniques such as those disclosed in U.S. patent application Ser. No. 319,066.

Figure 6:
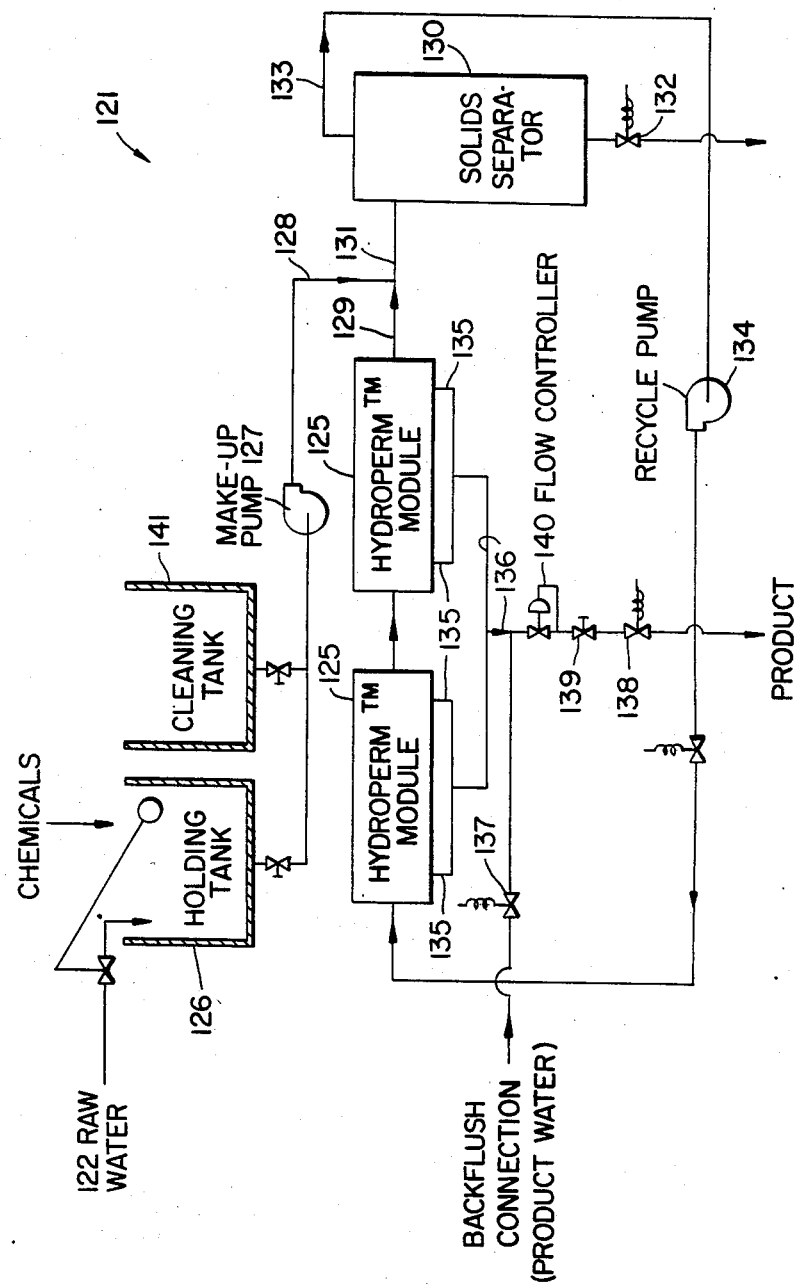
FIG. 6 is a schematic flow diagram illustrating a further embodiment of a filtration tube module suitable for use in the present invention showing additional process details.

Cross-flow filtration tests were made with a pilot-sized unit 121 that contained two identical 4 foot long pilot microfiltration tube modules 125 arranged in series, each with a 2.78 ft$^2$ of HYDROPERM TM tube area, as depicted in FIG. 6. Water from a small plastic holding tank 126 was pumped into the system at about 25 psig by a conventional makeup pump 127. The makeup stream 128 was mixed with a recycle stream 129 from the second module 125 before entering a conventional solids classifier/separator 130. Suspended solids contained in the combined stream 131 were partially removed by centrifugal force and periodically blown-down from the bottom of the separator via valve 132. Water exiting the top of the separator via line 133 was pressurized further with a conventional centrifugal recycle pump 134 to an average inlet pressure of 28 psig before entering the lead module 125, as shown by the arrows. Filtration occurred through the HYDROPERM TM tube walls (not shown) and filtrate was collected on the shell side of each module 125 and exited from the modules via exit ports 135 fluidly connected to product line 136. The exit velocity was 5 ft. per sec.

All tests were conducted with an artificial impurity, namely, an average of 50 mg/L commercial grade ferric sulfate, added to tap water 122 in the holding tank 126. The ferric sulfate immediately hydrolyzed to form a suspension of ferric hydroxide that served as filterable material for the experiments. Such filterable material was selected because it is similar to metal plating waste.

Backflushing was accomplished once per minute by opening valves 137 and 132 for 2 seconds and closing product line valve 138 for the same period of time, using product water as the backflushing liquid and a driving pressure of 45 psig, in the manner discussed previously.

Product line throttling was accomplished by partial closure of valve 139 and by the operation of pressure regulator 140 in the manner discussed previously.

Cleaning was performed after each experiment (i.e., at the end of each filtration run) by recycling a 1 percent acid solution containing hydrochloric acid through the modules 125 from cleaning tank 141.

Figure 8:
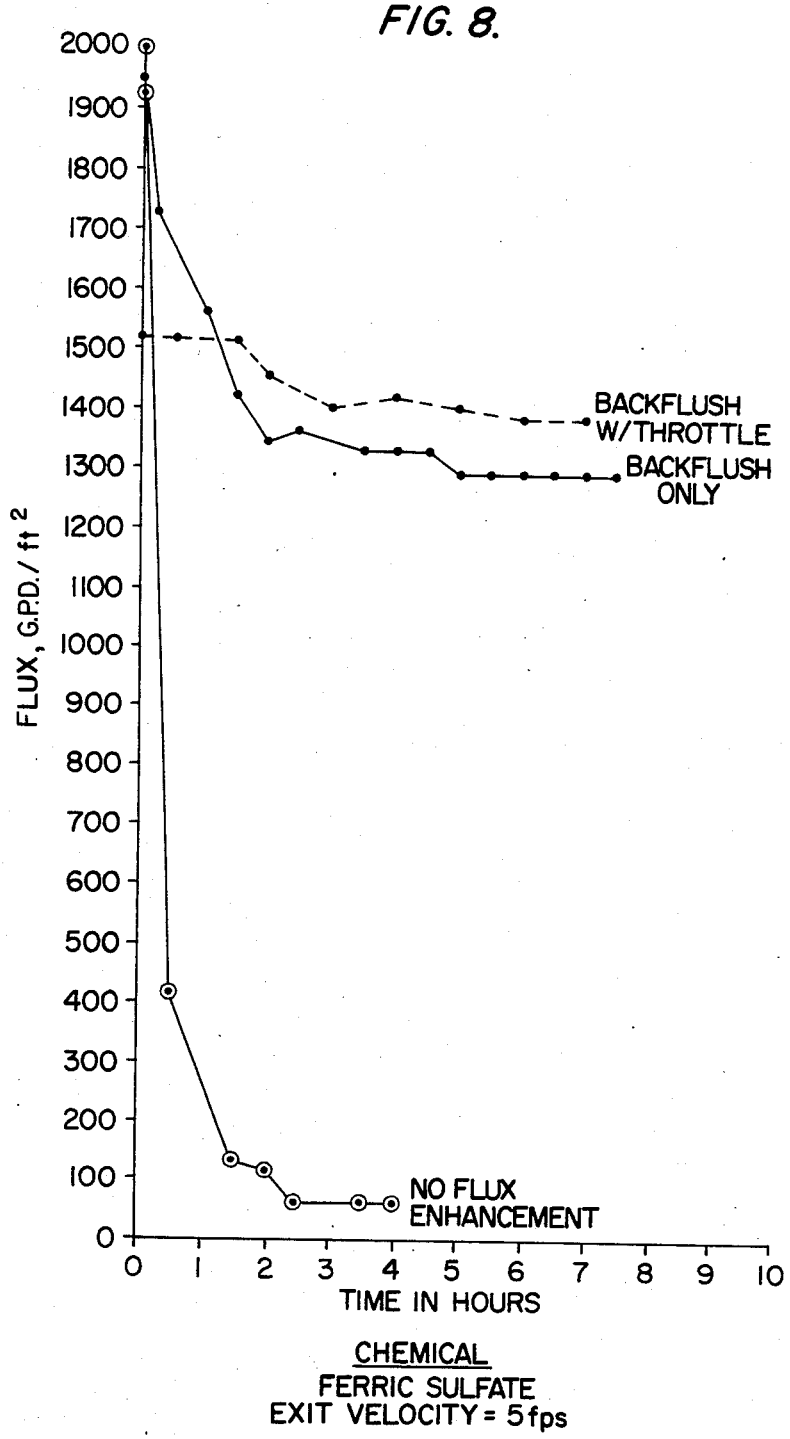
FIGS. 8-14 are graphs showing experimental data from the examples discussed below.

FIG. 8 is a graph showing the test results.

As can be seen from FIG. 8, with no flux enhancement, the non-equilibrium portion of the filter run began at 1942 gallons per day per square feet of active filter medium surface (gpd/ft$^2$) and ended after 2.5 hours, stabilized at a flux rate of 50 gpd/ft$^2$.

With backflushing alone, an equilibrium flux of 1295 gpd/ft$^2$ was observed. Using backflushing combined with product line throttling, a flux rate of 1372 gpd/ft$^2$ was achieved, for an increase of 6.2%. (The reason the throttled value tailed off with time is thought to be because there was not sufficient product water pressure for the flow controller 40 to operate properly, i.e. the pressure regulator required 10 psi upstream, and for most of the filtration run our system provided a product line pressure of less than 10 psi.) It should be noted that different absolute values of flux rate will be obtained using different backflushing frequencies and durations.

That flux enhancement was achieved with product line throttling was completely unexpected and contrary to prior art teachings. Indeed, manufacturers of conventional cross-flow filters make every effort to insure that product line throttling does not occur. It is reasoned in the art that throttling will decrease the flux, which of course it does, but only at the beginning of the run. What has not been realized in the art is that over the entire course of a filtration run (filter cycle), the time-averaged flux rate will actually be enhanced by throttling. The reason this occurs is that throttling maintains the non-equilibrium portion of the filtration run by metering out the pressure differential (driving pressure) only as needed to maintain a constant flux rate. The solids deposition rate is greatly reduced, as are the compressive forces acting on the dynamic membrane.

Figure 7:
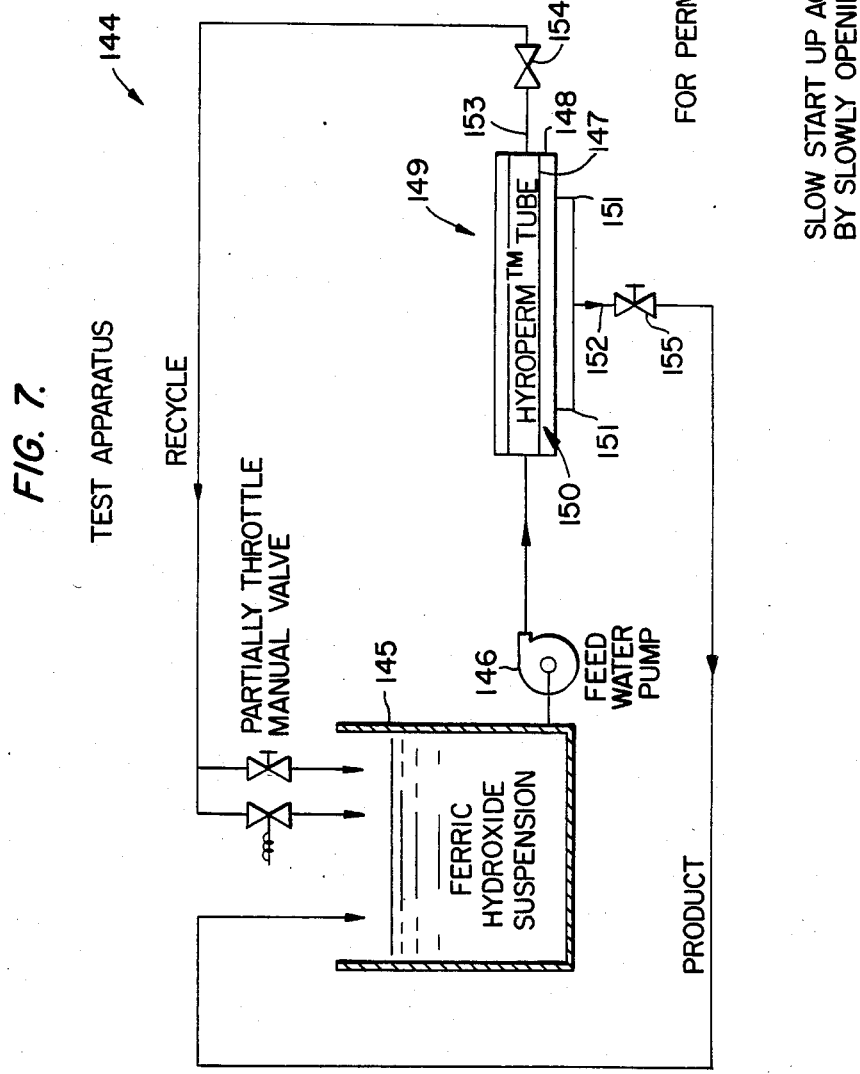
FIG. 7 is a schematic flow diagram showing a single crossflow filtration tube test apparatus.

Several sets of additional experiments were conducted using the single tube test apparatus 144 illustrated in FIG. 7.

Water from a small plastic recycle tank 145 was pumped at about 20 psig by a conventional feed pump 146 to a single 6 mm inner diameter, 3 foot long HYDROPERM TM tube 147 encased in a filtrate collection jacket 148 to form a module 149. Filtrate was removed on the shell side 150 of the module 149, and exited from the module via exit ports 151 in jacket 148 fluidly connected to product line 152. The remaining recycle flow 153 was piped back to holding tank 145. For test purposes, product water (i.e., filtrate) was also added back to holding tank 145 to provide a closed loop system.

Unless otherwise noted, the tests were conducted with 50 mg/L of commercial grade ferric sulfate and 0.2 mg/L of a cationic organic polymer added to tap water in holding tank 145. The ferric sulfate immediately hydrolyzed to form a suspension of ferric hydroxide that served as filterable material for the experiments. The polymer was added to improve the rheological quality of the solids.

Physical cleaning by periodically increasing recycle velocity (referred to hereinafter as "Perma Pulse") was evaluated by periodically increasing the recycle flow 153 by opening conventional valve 154. The recycle velocity varied from 4.4 ft. per sec. during filtration to 12.5 ft. per sec. during the Perma Pulse mode of operation. For these tests, the frequency between increases in recycle velocity was set at 2 minutes and the duration of each pulse was 15 seconds.

Slow startup tests were conducted by slowly and steadily opening valve 155 following cleaning, as described below.

The effects of product port closure vs. opening during cleaning were investigated by closing or opening valve 155 (FIG. 7) during the cleaning cycle.

Cleaning was performed before beginning each filtration run (e.g., after each experiment) by recycling an acid-containing cleaning solution through the filtration loop. (Clean flux was confirmed prior to each experiment by flowing deionized water through the module.)

Figure 9:
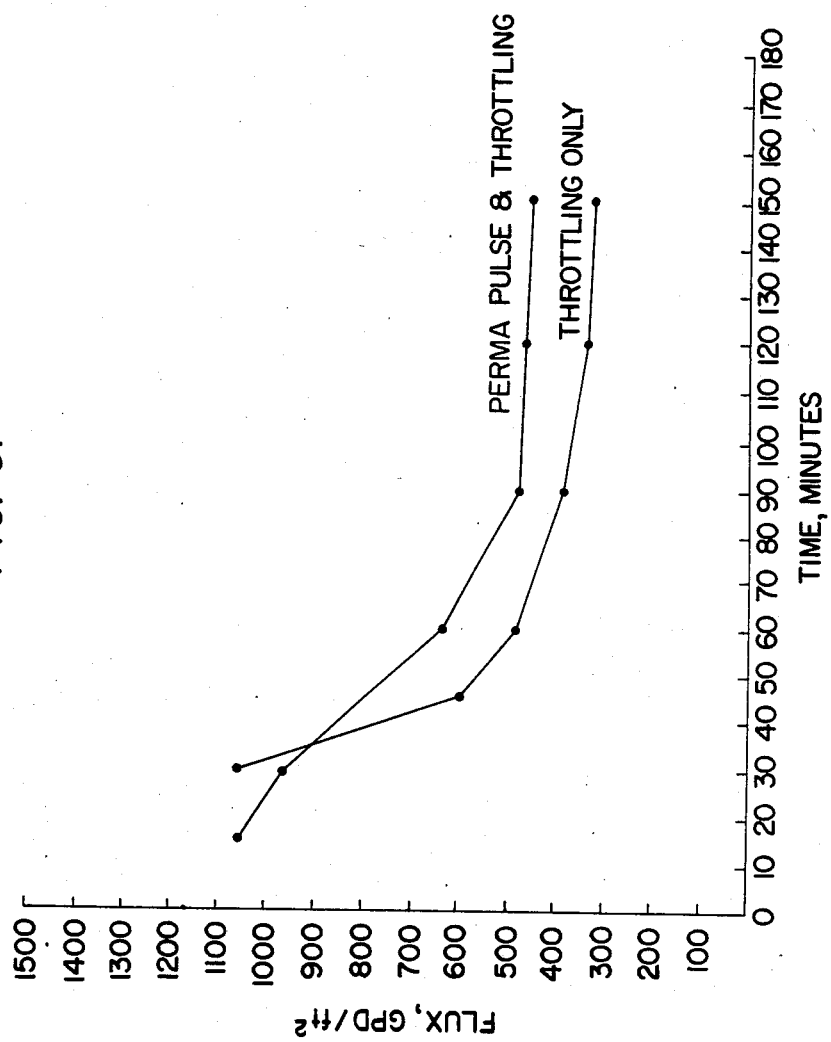

The results of one set of experiments are plotted in FIG. 9. These experiments contrasted Perma Pulse combined with product line throttling to product line throttling only. Product line throttling was accomplished to limit the flux rate to 1050 gpd/sq. ft. of active filter tube area. With product line throttling only, flux began to drop below the set point after about 30 minutes. Perma Pulse coupled with product throttling was slightly more effective than throttling alone.

Figure 10:
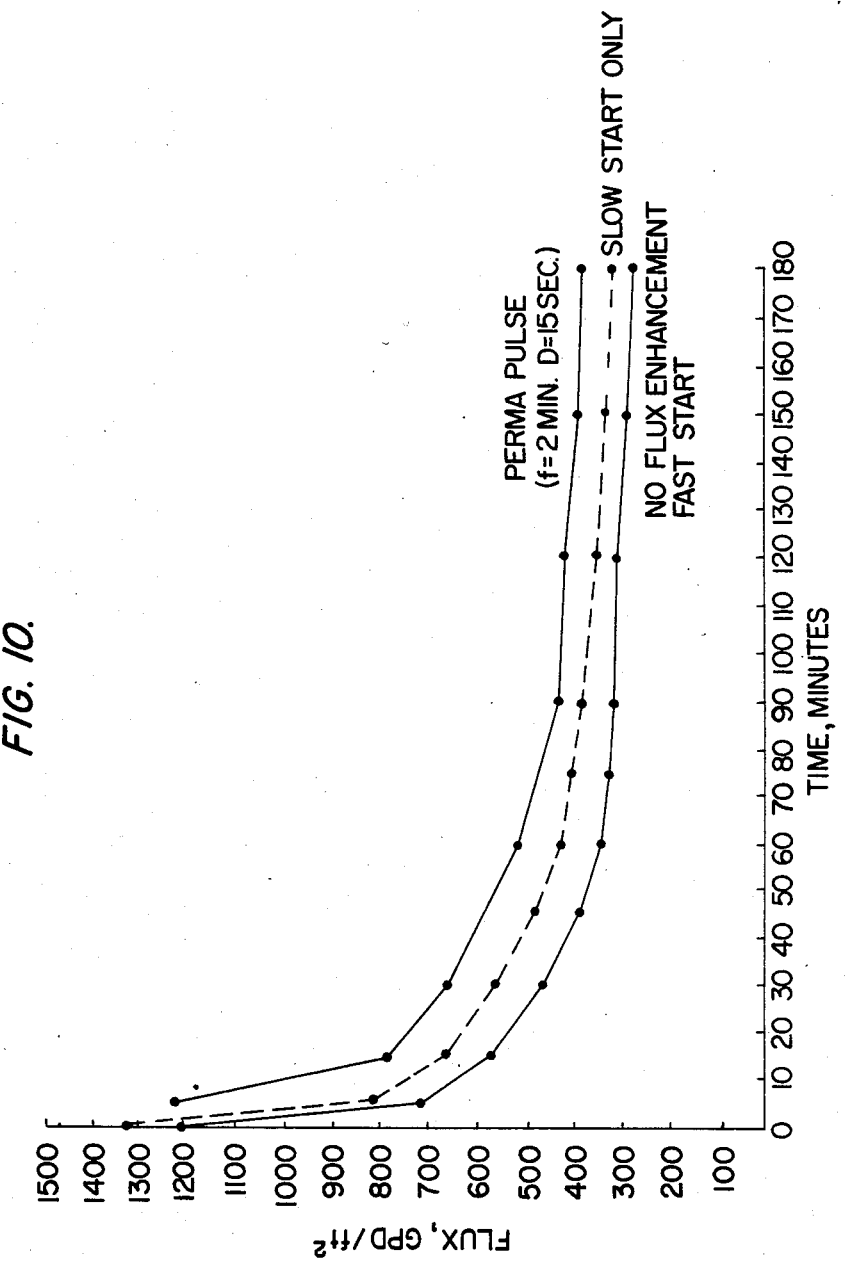

The results of a further set of experiments using the FIG. 7 test apparatus are plotted in FIG. 10. In these tests, a Perma Pulse plus slow startup run and a slow startup only run were contrasted to a run made with no flux enhancement procedures whatsoever. The Perma Pulse experiments were conducted in the slow startup mode, as described herein, in which product line 152 was steadily opened over a 1 minute period using valve 155. Perma Pulse frequency was 2 minutes with a duration of 15 seconds. Fluxes from all runs were seen to decline to an equilibrium value in about 90 minutes. The equilibrium flux for Perma Pulse plus slow startup was about 30 percent greater than that observed in the non-flux enhanced run. Perma Pulse equilibrium flux was about 17 percent higher than the equilibrium value of the run that incorporated slow startup only.

Figure 11:
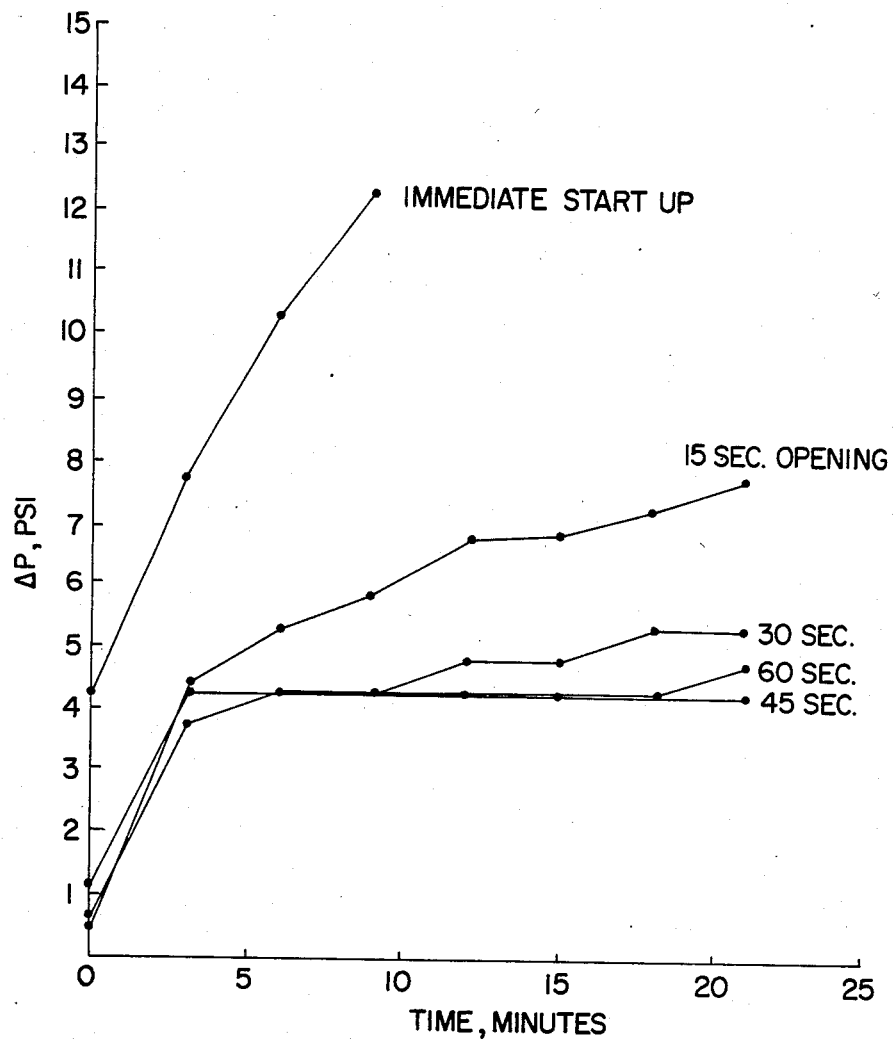

FIG. 11 is a graph plotting pressure differential ($\Delta P$) vs. time, showing the results of another set of experiments conducted using the FIG. 7 test apparatus. These tests investigated slow startup by gradually opening product line valve 155 over different periods of time. The flux rate was held constant by product line throttling, as described herein. As can be seen, the beneficial effects of slow startup, in terms of a lower driving pressure ($\Delta P$), are achieved for startup periods ranging from about 15 seconds to about 45 seconds, with gradual steady opening of product line valve 155 over a period of 45 seconds showing the best results. These tests were conducted with sea water plus 50 ppm aluminum sulfate as the filterable material, and utilized backflushing (as described previously) at a frequency of 60 seconds with a duration of 2 seconds (backflushing pump not shown).

As previously discussed, the present invention preferably makes use of a surprising effect resulting from leaving the product port 151, or product line valve 155, closed during acid cleaning of the filtration tubes. When product port 151 is open during cleaning, the initial (time zero) pressure differential is much higher than the starting $\Delta P$ obtained with the product port closed. Pressure differential also increases at a faster rate with time when product port 151 is left open during cleaning. Without this flux enhancement procedure, the limiting pressure differential ($\Delta P$) is reached in only 3 to 4 hours (at a constant flux rate). This compares with 12 or more hours typically achieved with this particular flux enhancement procedure of the invention.

Figure 12:
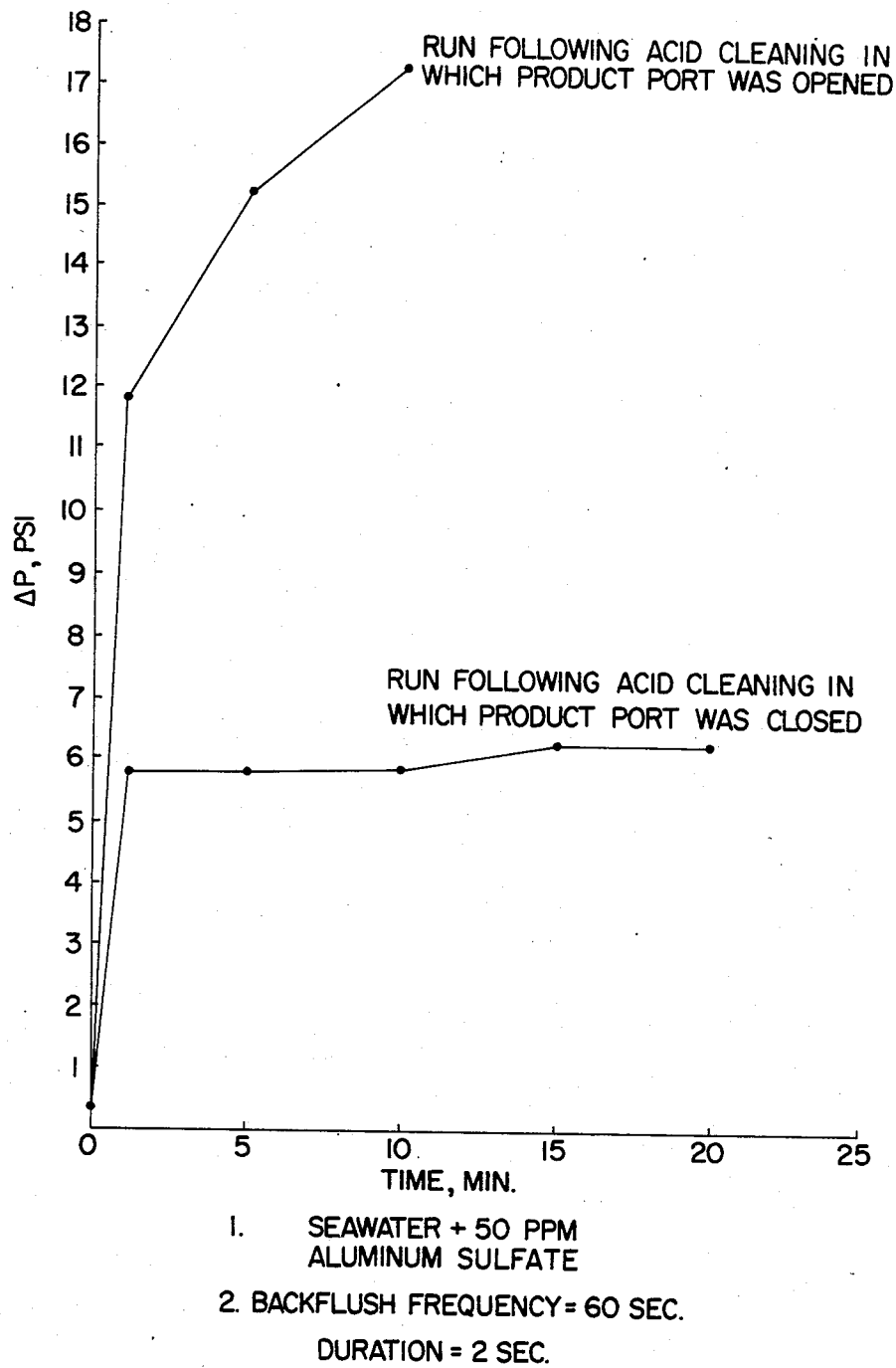

FIG. 12 is a graph plotting pressure differential ($\Delta P$) vs. time, showing the results of an additional set of experiments conducted using the FIG. 7 test apparatus. These tests compared a filtration run following acid cleaning during which product line valve 155 was opened with a filtration run following acid cleaning during which product line valve 155 was closed. The beneficial results of product port closure during acid cleaning can be readily seen, in terms of the lower driving pressure ($\Delta P$) experienced. The test conditions were essentially identical to those described above in connection with FIG. 11, including the use of backflushing.

For cross-flow filters to work most efficiently, a certain minimum suspended solids concentration must be present. Below this minimum, individual pores of the tube are blocked by individual particles (blocking filtration). This results in rapid flux declines. Above this minimum, particles become self-supporting and form a filter cake over the pores of the tube. In cake filtration, the tube matrix does not become blocked. This is the desired filtration mechanism, since resistance is minimal through a cake and maximum through a partially blocked tube matrix. This is the theory that underlies product port closure during cleaning in accordance with the present invention. Cleaning solution dissolves the bulk of the solids in the recirculating stream and may result in a solids concentration below that required for the initiation of cake filtration. If the product port is open and acid flows through the tube walls, matrix plugging can occur.

Test results from experiments which we have run indicate that the lime softening reaction time can be reduced significantly by the addition of calcium carbonate slurry to the reaction vessel. In our tests, lime was mixed in well water in laboratory beakers and different concentrations of aqueous calcium carbonate slurry were added. Calcium hardness was measured after mixing and then filtering through conventional paper filters.

Figure 13:
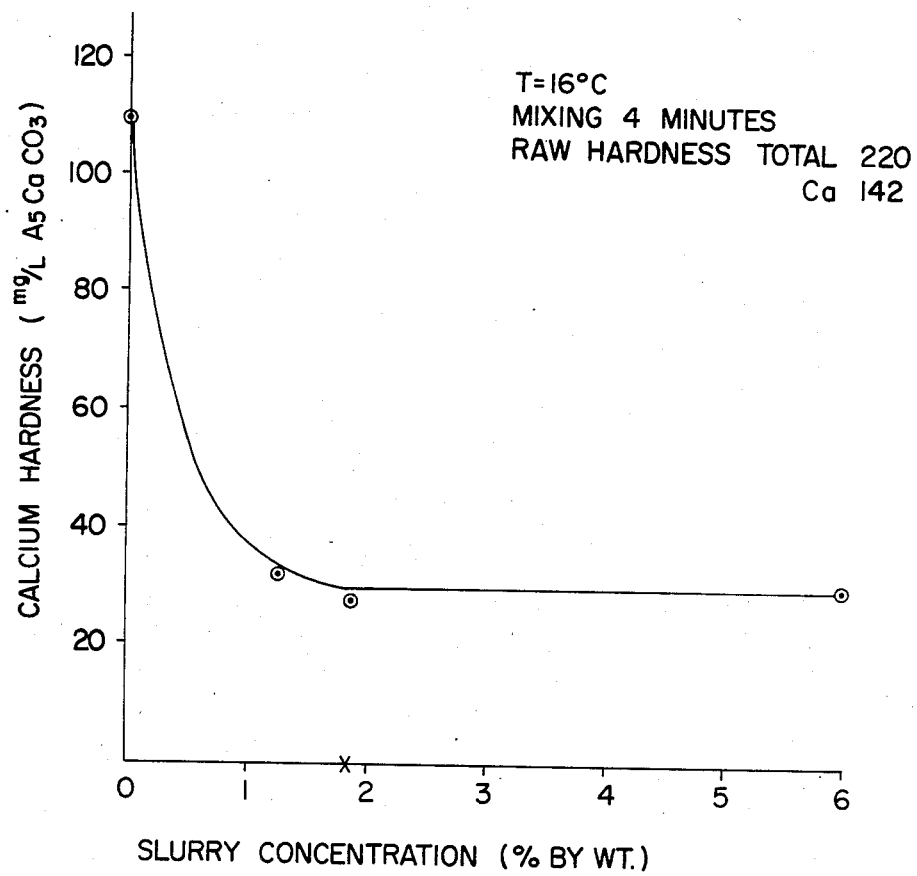

In the experiments reported on the graph shown in FIG. 13, calcium carbonate slurry concentrations varied from zero to 6 percent, by weight, using a uniform mixing time of 4 minutes. Measured raw water total hardness was 220 (calcium 142).

Figure 14:
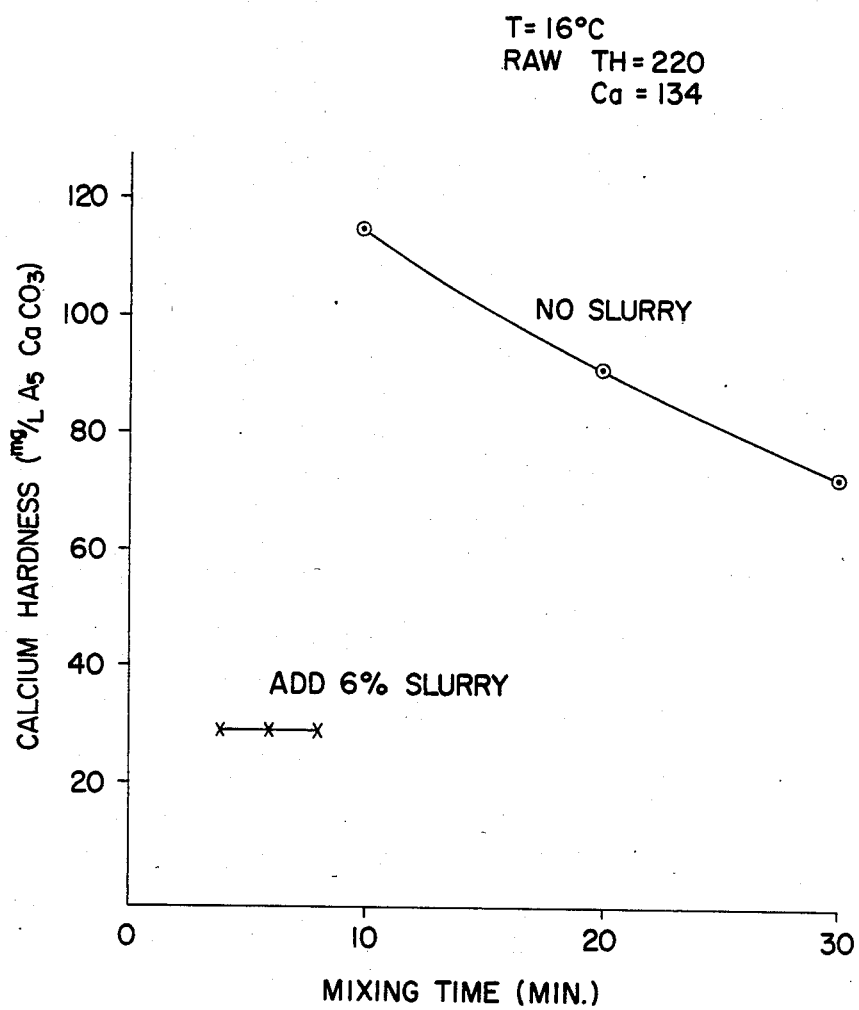

In the experiments reported on the graph shown in FIG. 14, two tests were conducted, one using no added calcium carbonate slurry and the other using an added calcium carbonate slurry of 6%, by weight. Calcium hardness was measured after various mixing times in both tests. Measured raw water total hardness for both tests was 220 (calcium 134).

The data plotted on FIG. 13 show that for a reaction time of 4 minutes, the effect of increased slurry concentration reaches a maximum at about 1.8% calcium carbonate, by weight, i.e., no further increase in reaction rate was observed at slurry concentrations greater than 1.8%.

The data plotted on FIG. 14 show the effect of adding calcium carbonate slurry on the lime softening reaction rate. As can be seen, with no added slurry, softening was not complete after 30 minutes of mixing, whereas, when 6% calcium carbonate slurry, by weight, was added, softening was complete within about 3 minutes.

Filtration fluxes through tubular cross-flow filtration modules can be increased by increasing the active filter tube surface area in the modules by, for example, increasing the length of the filter tubes. However, the pressure losses normally encountered across such cross-flow filtration modules, including friction losses, constitute a significant factor in limiting the practical length of conventional filter tubes. Consequently, it would be highly desirable to effectively remove or overcome such losses, so as to permit the practical use of considerably longer filter tubes, thereby increasing filtration fluxes.

Figure 15:
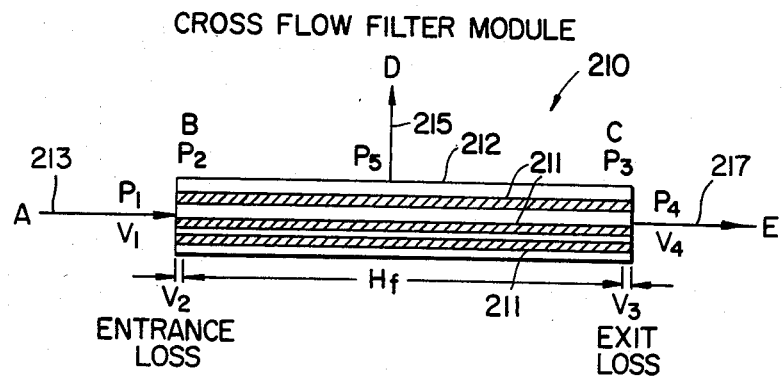
FIG. 15 is a schematic flow diagram illustrating a conventional prior art cross-flow filtration tube module.

FIG. 15 is a schematic flow diagram, in partial cross section, showing a conventional prior art filtration tube module. The suspended solids (and/or emulsified oil) laden liquid to be filtered flows through a filter tube module 210 in the direction shown by the arrows. As shown, tube module 210 includes three microporous filter tubes 211 (e.g., a HYDROPERM ™ tubes) encased within a closed filtrate collection jacket 212. Preferably, commercial scale tube modules 210 will include a plurality (as many as hundreds) of filter tubes 211 arranged in a parallel tube bundle (not shown) within a single jacket 212. A conventional inlet (circulation) pump (not shown) provides the requisite inlet pressure ($P_1$) and liquid flow velocity ($V_1$) in feed line 213.

A portion of the liquid is permeated transversely through the wall of filter tubes 211, thereby depositing at least a portion of the solids/emulsified oil on the inner surface of tubes 211 as a dynamic membrane (not shown), as discussed previously. The liquid permeated through filter tubes 211 (i.e. the filtrate) is collected in closed jacket 212 surrounding filter tubes 211, and the collected liquid is removed from jacket 212 via a port 214 extending through the jacket and connected to product (filtrate) line 215. The filtrate exit pressure in product line 215, designated ($P_5$), is essentially zero in conventional cross-flow filtration systems.

The portion of the liquid which is not permeated through the wall of filter tubes 211 exits from module 210 via a port (not shown) in jacket 212 and via exit line 217 connected thereto at a velocity designated $V_4$ and at an exit pressure designated $P_4$, as shown. A conventional back pressure valve (not shown) is typically situated in exit line 217 to establish a net positive pressure in filter tubes 211, as known in the art.

The above-described flux enhancement technique is preferably practiced together with a conventional form of physical cleaning of the filter medium, namely, backflushing.

In FIG. 15, "P" values are the pressures at the indicated locations; "V" values are the fluid velocities at the indicated locations; and "Hf" is the friction loss across the tube module.

Referring still to FIG. 15, in conventional cross-flow filter modules 210, feedwater enters the filtration module 210 at A. Filtrate exits at D, and the reject exits at E. Pressure losses normally encountered across such conventional modules 210 include: (1) the module entrance loss at B, (2) the friction loss, Hf, across the module and (3) the module exit loss at C.

Table B lists the average headloss expressions (in ft. of water) for the module 210 depicted in FIG. 15.

Table C lists calculated loss of head values for the module entrance and exit losses for an eight foot long filtration module similar to module 210. Also listed are the measured total pressure loss across the module (from A to E) and the friction loss across the module, calculated by subtracting the calculated entrance and exit losses from the total measured loss. The module comprised two 4 ft. long modules fluidly connected in series, with 12 HYDROPERM ™ filter tubes per module. The inner diameter of the modules was 1½ inches, the inner diameter of each tube was 6 mm, and the total active tube surface area for the two modules was 5.6 sq. ft.

The loss of head observed in conventional cross-flow filtration devices is undesirable for a number of reasons. First, flux rate can be shown to be a function of the average driving pressure of the module ($\Delta P$) which, in the terminology of FIG. 15, is expressed as follows:

$$\Delta P_{ave} = \left( \frac{P_2 + P_3}{2} \right) - P_5$$

Thus, when P3 is reduced to a value less than P2, $\Delta P$ will be decreased by an amount equal to $$\left( \frac{P_2 - P_3}{2} \right) - P_5,$$

with a proportional drop in the flux rate. There is also an unequal distribution of flux across the module when P3 is less then P2, since $\Delta P$ measured at B is greater than $\Delta P$ at C. Since filter tube fouling is proportional to the flux rate, the head (feed) end B of the module 10 will foul at the greatest rate.

Another unwanted consequence of P3 being less than P2 is that backflushing cleaning techniques will be less successful. Backflushing is typically accomplished by backflushing filtrate transversely through the filter tube wall from the filtrate side by reversing the direction of the pressure differential, i.e., so as to reverse the direction of flow in product line 215. When P3 is less than P2, the majority of the backflush flow will pass through the low pressure end of the filter tube (C). The high pressure end of the module (B), which is fouled the most severely will, thus, be cleaned least efficiently.

It can therefore be seen that pressure loss is a significant factor which limits the length of conventional cross-flow filtration modules. As an example, Table D lists the calculated friction losses for various length cross-flow filter modules when operated at an average velocity of 8 feet/second.

Figure 16:
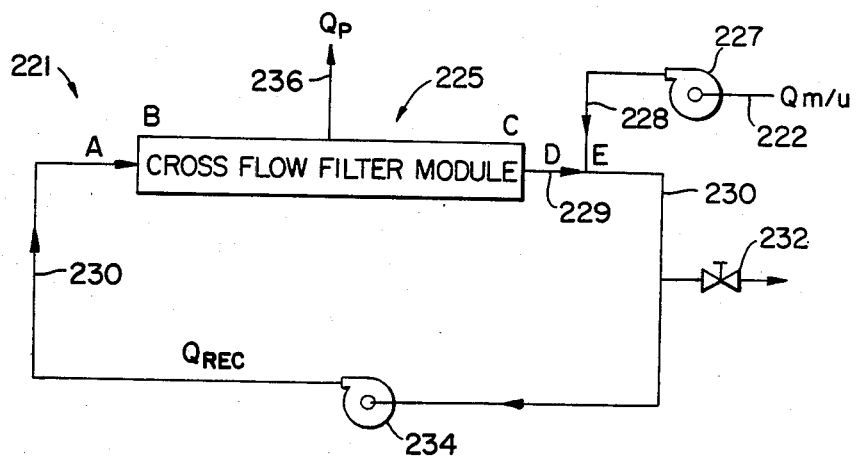
FIG. 16 is a schematic flow diagram illustrating another preferred embodiment of a filtration tube module suitable for use in the lime softening system of the present invention.

Referring now to FIG. 16, the lime softening system of the present invention preferably includes a further technique for increasing the cross-flow filtration flux of a liquid through an elongated porous filter tube (not shown) in filtration system 221, comprising the steps of flowing a portion of the liquid transversely through the filter tube wall by establishing a pressure differential across the filter tube wall and maintaining the filtration flux rate transversely through the filter tube wall at substantially the same value along the entire length of the filter tube during filtration. Typically, the portion of the liquid exiting from the downstream (outlet) end (C) of the filter tube is recycled back to the feed end (B) of the filter tube via a return (recycle) line 230 having a recycle pump 234 operatively connected thereto. The filtration flux rate is maintained at substantially the same value along the entire length of the filter tube by pumping make-up of the liquid to be filtered (using pump 227) into the return line 230 at point (E) between the downstream end (C) of the filter tube and the recycle pump 234. As a result, the pressure drop measured between point (A) immediately upstream of the feed end of module 225 and point (D) immediately following the downstream end of the module approaches zero during filtration. In a closed loop system such as that shown in FIG. 16, the flow rate of the make-up liquid in line 228 must equal the flow rate of the filtrate permeated through the filter tube wall.

Although the pressure losses are masked within module 225, as described above, the recycle pump 234 must, nevertheless, be sized to account for the module entrance loss, the module exit loss and the friction loss across the module. The make-up pump 227 serves to increase the system pressure.

Preferably, the step of periodically backflushing a liquid transversely through the filter tube wall from the filtrate side by reversing the direction of the pressure differential, thereby physically cleaning the filter tube is also incorporated into the filtration module utilized in the present invention. Typically, the backflushed liquid includes the filtrate, the duration of each backflushing period is about 2 seconds, and the interval between backflushings is within the range of from about 1 minute to about 2 minutes. The backflushing pressure is preferably on the order of about 50 psi. Typically, a plurality of elongated porous filter tubes (not shown) are provided in module 225, with the tubes being encased in a filtrate collection jacket (not shown). The tubes and the jacket together form filtration module 225.

The above-noted features have the effect within the filtration module of removing or overcoming (i.e., masking) pressure losses normally associated with the module. This is accomplished by a two pump system as diagrammed, for example, in FIG. 16. Feedwater enters the module at A and reject exits at D.

Additional pumping energy is supplied at E by the addition of make-up water. This is a closed loop system with respect to the recycle, with periodic solids blowdown at valve 232 being provided. In accordance with the present invention, the pressure at D may be made to equal (or even exceed) the pressure at A by simply providing sufficient pressure at E. This is illustrated by the following energy balance for module 225 (in units of pressure):

$$P_A + \left(\frac{(V_A)^2}{2g}\right) - H_{AB} - H_{BC} - H_{CD} +$$

$$H_E = P_D + \left(\frac{(V_D)^2}{2g}\right)$$

Where,
$P_A$ = Pressure at A
$V_A$ = Velocity at A
$P_D$ = Pressure at D
$V_D$ = Velocity at D
$H_{AB}$ = Module entrance loss
$H_{BC}$ = Friction loss across module
$H_{CD}$ = Module exit loss
$H_E$ = Energy input at E
When $P_A = P_D$ (as desired in the present invention), $$H_E = \left(\frac{(V_D)^2}{2g}\right) - \left(\frac{(V_A)^2}{2g}\right) + H_{AB} + H_{BC} + H_{CD}$$

Table E lists observed pressure and velocity data from an experiment conducted with a two pump apparatus such as that shown in FIG. 16. The cross-flow filtration experiment was conducted on a pilot-sized unit 221 that contained one 6.71 foot long cross-flow filtration module 225 with 4.8 ft$^2$ of HYDROPERM ™ active tube area. Water from a holding tank (not shown) was pumped into the system at about 37.5 psig by a make-up pump 227. The make-up stream 228 was mixed with a recycle stream 229 at E before entering a conventional solids classifier/separator (not shown). Suspended solids contained in the combined stream 230 were partially removed by centrifugal force and periodically blowndown from the bottom of the separator via valve 232. Water exiting from the top of the separator was pressurized by a conventional centrifugal recycle pump 234 to an average inlet pressure of 38 psig before entering the module 225. Filtration occurred transversely through the HYDROPERM ™ tube walls (not shown) and filtrate was collected on the shell side of module 225 and exited from the module via product line 236. The entrance velocity at B was 10 ft. per sec. and the exit velocity at C was 7 ft. per sec.

All tests were conducted with an artificial impurity, namely, lime added to tap water in the holding tank. The lime precipitated hardness in the water to form a 2% (by wt.) suspension of calcium carbonate that served as filterable material for the experiment.

Backflushing was accomplished once per minute by reversing the flow direction in product line 236 for 2 seconds, using product water as the back-flushing liquid and a driving pressure of 60 psig, in the manner discussed previously.

Referring to FIG. 16, $Q_p$ is the filtrate flow rate (gal./min.), $Q_{m/u}$ is the make-up flow rate (gal./min.), and $Q_{REC}$ is the recycle flow rate (gal./min.).

Table E lists the measured liquid flow velocity (ft. per sec.) and pressure (psi) at location A (i.e., immediately upstream of the feed end of module 225) and at location D (i.e., immediately downstream of the outlet of module 225).

As can be seen, the measured pressure at location D was virtually equal to the measured pressure at location A. That is, the normal entrance loss, exit loss and friction loss across module 225 were effectively removed or masked within the module. In the absence of such losses, module 225, and specifically, the filtration tubes in the module, can be constructed at any length desired to achieve maximum filtration fluxes.

Table E also lists the calculated single pump (i.e., conventional) system pressures for comparison purposes. As shown, for a similar conventional single pump system, a 4.7 psi pressure drop would be expected across a similar length module (i.e., the difference between the pressure calculated at A and that calculated at D). These conventional values were calculated on the basis of the following assumptions: (1) make-up pump 227 was eliminated from the system; (2) reject line 229 has a conventional back pressure valve (not shown) and reject flows into an open tank (not shown); (3) recycle pump 234 would be fed directly from the open tank; and (4) average liquid flow velocity inside the porous filtration tubes of 7.6 ft. per sec.

The present invention thus includes cross-flow filtration techniques for masking pressure losses within the filtration module, thereby removing such losses as a factor in limiting maximum module (tube) length and permitting increased filtration fluxes, and by improving the efficiency of backflushing cleaning techniques by providing a constant flux rate along the entire length of the filter tubes.

Referring still to FIG. 16, flux enhancement in accordance with the invention is critically dependent on the proper sizing of the recycle pump 234 and the make-up pump 227. Failure to do so will result in unequal pressures at points A and D in the system. For example, if the recycle pump 234 is oversized, the pressure at A will be greater than the pressure at D. Conversely, if the make-up pump 227 is oversized, the pressure at D may exceed the pressure at A. Preferably, such situations should be avoided in practicing the invention.

The recycle pump 234 must be sized to provide the desired recycle flow rate ($Q_{REC}$) at the total dynamic friction head generated within the filtration loop. For a loop such as that shown in FIG. 16, such friction losses include: (1) all piping and fitting losses between the recycle pump discharge point and the filtration tube module entrance at A, (2) module entrance, exit and friction losses, and (3) piping and fitting losses between the filtration tube module exit at D and the recycle pump intake.

For the system shown in FIG. 16, the make-up pump 227 must be sized to pump a flow rate equal to the product (filtrate) flow rate ($Q_p$) at the desired filtration module exit pressure (at D) plus the total friction head (e.g., piping and fitting losses) between the make-up pump discharge point and point E, immediately following the filtration tube module exit at D (pressure at D and E may properly be assumed to be equal). That is, the total dynamic head for the make-up pump equals the desired pressure at D plus the friction head losses between the make-up pump discharge point and point E.

With regard to the specific type of pumps to be utilized for the recycle pump 234 and the make-up pump 227, conventional centrifugal pumps and positive displacement pumps may be used for each. However, centrifugal pumps are preferred because of their versatility, simplicity and availability.

FIG. 17 is a schematic flow diagram showing another embodiment of the lime softener of the present invention which was used to conduct experimental tests. This embodiment is generally similar to that illustrated in FIGS. 3A–3D and described fully above. Thus, for ease of understanding, the equipment shown in FIG. 17 which is identical to, or functions substantially similar to, equipment shown in FIGS. 3A–3D bears the same reference numeral and its operation will not be repeated here. In the test unit shown in FIG. 17, the cylindrical HYDROPERM ™ cross-flow microfiltration module 40 was about 6.71 ft. long and had an outer diameter of 1½ inches, with a total effective filter tube surface area of 4.8 sq. ft. Backflushing was accomplished intermittently for 2 seconds every minute. The first and second rinse cycles (before and after acid cleaning) utilized both the make-up pump 57 and the recycle pump 61, with the first rinse being dumped in the reaction tank 51 and the second rinse being drained. Acid cleaning utilized only the make-up pump 57, with a reversal in the direction of longitudinal flow through the module 62 and recycling of the acid cleaning solution back to tank 75. Conventional chemical feed pumps (not shown) were provided for the addition of lime slurry and chemicals to reaction tank 51.

Tables F and G tabulate the raw water and softened water quality parameters, respectively, observed in connection with the experiments conducted using the test unit depicted in FIG. 17. As can be readily seen, excellent water softening efficiency was achieved. The pH values listed in Table G were obtained from the effluent water.

It will be apparent to those of ordinary skill in the art that various modifications and variations can be made to the above-described embodiments of the invention without departing from the scope of the appended claims and their equivalents. For example, for certain applications, if grit removal from the water being treated is required, a conventional classifier may be installed ahead of the reaction tank in the raw water line. Thus, it is intended that the present invention cover the modifications and variations of this invention, provided they come within the scope of the appended claims and their equivalents.

TABLE A

SOFTENED WATER QUALITY

| Substance | Raw Water | Softened Water | Calculated Quality | Marble Test |
|---|---|---|---|---|
| Calcium | 136–142 | 24–26 | 35 | 24–12 mg/L |
| Magnesium | 86–90 | 40–60 | 65 | 64–58 |
| Alkalinity | 234–242 | 60–90 | 89 | 84–66 |
| Iron | 0.04 | <0.03 | <0.03 | — |
| Manganese | 0.4–0.8 | <0.03 | <0.03 | — |
| pH | 6.8–7.2 | 9.7–10.2 | 10.2 | 9.7–9.8 |
| Turbidity | 0.2–0.4 | 0.08 | — | — |

TABLE B

HEADLOSS ITEMS

| Item | Average Lost Head |
|---|---|
| Entrance loss | $0.5 \frac{(V_2)^2}{2g}$ |
| Friction loss | $f \cdot \frac{L}{D} \cdot (\overline{V})^2 \cdot \frac{1}{2g}$ |
| Exit loss | $\frac{(V_3)^2}{2g}$ |

Notes:
1. f is the friction coefficient of the filtraion tube, L the tube length, and D the tube diameter.
2. V values are velocities in feet/second.
3. g is the gravitational content.
V is the average velocity across the filter module equal to $$\left( \frac{V_2 + V_3}{2} \right).$$

TABLE C

LOSS OF HEAD VALUES ACROSS AN EIGHT FOOT LONG MODULE

| Item | Loss, psi |
|---|---|
| Entrance loss | 0.263 |
| Friction loss | 4.11 |
| Exit loss | 0.313 |
| Total losses | 4.69 |

Operating Parameters:
1. Velocities
   $V_2$ = 8.85 fps
   $V_3$ = 6.83 fps
2. Flux rate = 804 gal/day/ft$^2$

TABLE D

MODULE LENGTH VERSUS FRICTION LOSS

| Module length, feet | Friction loss, psi |
|---|---|
| 4 | 2.32 |
| 8 | 4.65 |
| 12 | 6.97 |
| 16 | 9.30 |
| 20 | 11.62 |

Notes:
1. Filtration tubes are 0.236 inches I.D.
2. Friction factor used to calculate losses is 0.027.

TABLE E
OBSERVED VERSUS CALCULATED PRESSURE DROP

| Location | Velocity, fps | Observed Pressure, psi | Calculated Single Pump System Pressures |
|---|---|---|---|
| A | 2.85 | 38 | 38 |
| D | 2.03 | 37.5 | 33.3 |

Notes:
1. Module length was 6.71 feet.
2. Flux rate was 1,350 gal/Day/ft$^2$

TABLE F
RAW WATER QUALITY

| Items | Unit | Mean Value | Standard Deviation |
|---|---|---|---|
| Total Alkalinity | mg/L as CaCO$_3$ | 220.8 | 6.36 |
| Calcium Hardness | mg/L as CaCO$_3$ | 136.2 | 4.3 |
| Magnesium Hardness | mg/L as CaCO$_3$ | 90.5 | 6.8 |
| Total Hardness | mg/L as CaCO$_3$ | 226.8 | 7.5 |
| pH | — | 7.34 | 0.13 |
| Turbidity | NTU | 0.45 | 0.25 |
| Iron | mg/L as Fe | 0.04 | 0.02 |
| Manganese | mg/L as Mn | 0.36 | 0.24 |
| Temperature | °C. | 15.0 | 1.7 |
| Silt Density Index | — | 5.33 | 0.20 |

TABLE G
EFFLUENT WATER QUALITY

| | Items | Unit | Mean Value | Standard Deviation |
|---|---|---|---|---|
| pH 10.1 | Phenoph. Alkalinity | mg/L as CaCO$_3$ | 51.6 | 12.0 |
| | Total Alkalinity | | 104.3 | 10.9 |
| | Ca - Hardness | | 35.3 | 4.9 |
| | Mg - Hardness | | 71.0 | 8.3 |
| pH 10.6 | Phenol. Alkalinity | | 58.4 | 7.8 |
| | Total Alkalinity | | 94.6 | 12.9 |
| | Ca - Hardness | | 41.4 | 7.3 |
| | Mg - Hardness | | 59.9 | 14.9 |
| pH 10.97 | Phenol. Alkalinity | | 67.0 | 7.3 |
| | Total Alkalinity | | 94.4 | 8.4 |
| | Ca - Hardness | | 50.8 | 7.4 |
| | Mg - Hardness | | 51.4 | 3.1 |
| | Turbidity | | 0.096 | 0.042 |
| | Fe | | 0.025 | 0.014 |
| | Mn | | 0.071 | 0.057 |
| | Silt Density Index | | 0.655 | 0.106 |
| | Temperature | | 15.7 | 1.426 |

What is claimed is:

1. A method for softening an aqueous fluid containing harness constituents, comprising the steps of:
    (a) mixing the fluid with sufficient amounts of a lime-containing softening agent and previously precipitated hardness constituents including, calcium carbonate in a reactor to establish a lime softening reaction in the reactor for precipitating a substantial portion of the hardness constituents including calcium carbonate contained in the fluid;
    (b) prior to any substantial settling of the precipitated harness constituents, removing a portion of the fluid and precipitated hardness constituents from the reactor as a slurry having a concentration of at least about 1%, by weight, of said precipitated hardness constituents, and filtering the slurry through at least one cross-flow microfiltration module containing at least one elongated microporous thermoplastic filtration tube, said tube having a pore size of from about 1 micron to about 10 microns and a filter cake of said precipitated hardness constituents at the inner wall thereof, whereby substantially all of the precipitated hardness constituents are removed from the portion of the fluid exiting from the module as filtrate; and
    (c) returning at least a portion of the filtered out precipitated hardness constituents exiting from the module as a slurry to the reactor as the previously precipitated hardness constituents.

2. A method as claimed in claim 1, wherein the microfiltration module contains a plurality of elongated filtration tubes.

3. A method as claimed in claim 1 wherein the slurry is filtered through a plurality of cross-flow microfiltration modules piped together in series.

4. A method as claimed in claim 1, wherein the concentration of precipitated hardness constituents and previously precipitated hardness constituents in the reactor is constantly maintained within the range of from about 1% to about 4%, by weight.

5. A method as claimed in claim 1, wherein the concentration of precipitated hardness constituents and previously precipitated hardness constituents in the reactor is constantly maintained at about 2%, by weight.

6. A method as claimed in claim 1, wherein the average mixing time of the fluid in the reactor is about 4 minutes.

7. A method as claimed in claim 1, wherein the filtration flux through the microfiltration module is maintained at a constant value during the filtration run, said value being within the range of from about 1050 to about 1500 gallons per day per sq. ft. of active filtration tube surface area.

8. A method as claimed in claim 1, wherein the fluid velocity measured at the slurry exit end of the microfiltration module is about 4 ft./sec.

9. A method as claimed in claim 1, further comprising the step of adding an organic polymer to the mixture in the reactor.

10. A method as claimed in claim 1, further comprising the step of continually recycling a portion of the filtered out precipitated hardness constituents exiting from the microfiltration module to the feed end of the module during filtration.

11. A method as claimed in claim 1, wherein the fluid flows transversely through the filtration tube wall by establishing a pressure differential across the wall, and further comprising the step of maintaining the filtration flux rate through the tube at a preselected substantially constant value during the entire filtration run by applying a variable throttling pressure on the filtrate side of the tube and reducing said throttling pressure during the run to control the instantaneous value of said pressure differential as required to maintain said preselected flux rate, said flux rate being greater than the equilibrium flux rate, whereby the time-averaged filtration flux over the period of the filtration run is increased.

12. A method as claimed in claim 11, wherein the filtrate which is permeated through the filtration tube wall is collected in a closed jacket surrounding said tube, and wherein said variable throttling pressure is applied to a product line exiting from said jacket.

13. A method as claimed in claim 12, further comprising the step of cleaning the interior surface of the filtration tube prior to commencement of the filtration run by flowing a cleaning solution laterally over said tube surface while simultaneously temporarily eliminating said pressure differential across the filtration tube by blocking all flow from said jacket.

14. A method as claimed in claim 11, further comprising the step of cleaning the surface of the filtration tube prior to commencement of the filtration run by flowing a cleaning solution laterally over said surface while simultaneously temporarily eliminating said pressure differential across the filtration tube 15. A method as claimed in claim 11, further comprising the step of periodically backflushing a liquid transversely through the filtration tube wall by reversing the direction of said pressure differential, thereby physically cleaning the filtration tube.

16. A method as claimed in claim 15, wherein said backflushed liquid includes said filtrate and the duration of each backflushing period is about 2 seconds and the interval between backflushings is within the range of from about 1 minute to about 2 minutes.

17. A method as claimed in claim 11, further comprising the step of periodically increasing the circulation velocity of the slurry flowing laterally along the interior surface of the filtration tube, thereby physically cleaning said surface.

18. A method as claimed in claim 17, wherein the duration of each such periodic increase in circulation velocity is within the range of from about 5 seconds to about 60 seconds, the interval between such periodic increases does not exceed about 20 minutes, and the circulation velocity is increased to a value within the range of from about 10 to about 20 ft. per sec.

19. A method as claimed in claim 1, further comprising the step of commencing the filtration run by gradually increasing the flow rate of the filtrate from essentially zero to the desired operational flow rate over a sufficiently extended period of time to substantially prevent the deleterious intrusion of the precipitated hardness constituents filtered out of the fluid into the filtration tube wall matrix.

20. A method as claimed in claim 19, wherein said extended period of time is within the range of from about 15 seconds to about 45 seconds.

21. A method as claimed in claim 19, further comprising the step of cleaning the interior surface of the filtration tube prior to commencement of the filtration run by flowing a cleaning solution laterally over said tube surface while simultaneously temporarily eliminating said pressure differential across the filtration tube.

22. A method as claimed in claim 1, wherein the fluid flows transversely through the filtration tube wall by establishing a pressure differential across the wall, and further comprising the step of maintaining the filtration flux rate transversely through the filtration tube wall at substantially the same value along the entire length of the tube during filtration, whereby the filtration flux is increased.

23. A method as claimed in claim 22, wherein the portion of the slurry exiting from the downstream end of the filtration tube is recycled back to the feed end of the tube via a return line having a recycle pump operatively connected thereto, and wherein the filtration flux rate is maintained at substantially the same value along the entire length of the filtration tube by pumping the slurry to be filtered into said return line at a point between the downstream end of the filtration tube and said recycle pump connection, whereby the pressure drop measured between a point immediately upstream of said feed end and a point immediately following said downstream end is approximately zero during filtration.

24. A method as claimed in claim 23, wherein the flow rate of said slurry is selected to equal the flow rate of the filtrate permeated, through the filtration tube wall.

25. A method as claimed in claim 22, further comprising the step of periodically backflushing a liquid transversely through the filtration tube wall from the filtrate side by reversing the direction of said pressure differential, thereby physically cleaning the tube.

26. A method as claimed in claim 22, wherein the pressure immediately downstream of the filtration tube and the pressure immediately upstream of the tube are maintained at equal values.

27. A method as claimed in claim 1, further comprising the step of periodically backflushing a portion of the filtrate transversely through the filtration tube wall from the filtrate side, said backflushing flow comprising about 0.5 gallons per minute per sq. ft. of active filtration tube surface.

* * * * *

UNITED STATES PATENT AND TRADEMARK OFFICE
CERTIFICATE OF CORRECTION

PATENT NO. : 4,670,150

DATED : June 2, 1987

INVENTOR(S) : HSUING, et al.

It is certified that error appears in the above-identified patent and that said Letters Patent is hereby corrected as shown below:

In the Abstract: Line 15; change "constiuents" to -- constituents --.

Claim 1: Column 25, Line 59; change "harness" to -- hardness --.

Signed and Sealed this

Twenty-seventh Day of October, 1987

Attest:

DONALD J. QUIGG

Attesting Officer

Commissioner of Patents and Trademarks